Feb. 1, 1966   J. BENNETT ETAL   3,233,214
APPARATUS FOR THE PRODUCTION OF BORE HOLE LOGS
Filed Sept. 8, 1960   9 Sheets-Sheet 1

FIG. I.

INVENTORS
JOHN BENNETT
PRESTON E. CHANEY
JACK WEIR JONES &
BY   FRED M. MAYES

Busser, Smith & Harding
ATTORNEYS

INVENTORS
JOHN BENNETT
PRESTON E. CHANEY
JACK WEIR JONES &
FRED M. MAYES
BY

ATTORNEYS

INVENTORS
JOHN BENNETT
PRESTON E. CHANEY
JACK WEIR JONES &
FRED M. MAYES
BY

ATTORNEYS

INVENTORS
JOHN BENNETT
PRESTON E. CHANEY
JACK WEIR JONES &
FRED M. MAYES
BY

ATTORNEYS

Feb. 1, 1966    J. BENNETT ETAL    3,233,214
APPARATUS FOR THE PRODUCTION OF BORE HOLE LOGS
Filed Sept. 8, 1960    9 Sheets-Sheet 6

INVENTORS
JOHN BENNETT
PRESTON E. CHANEY
JACK WEIR JONES &
FRED M. MAYES
BY

ATTORNEYS

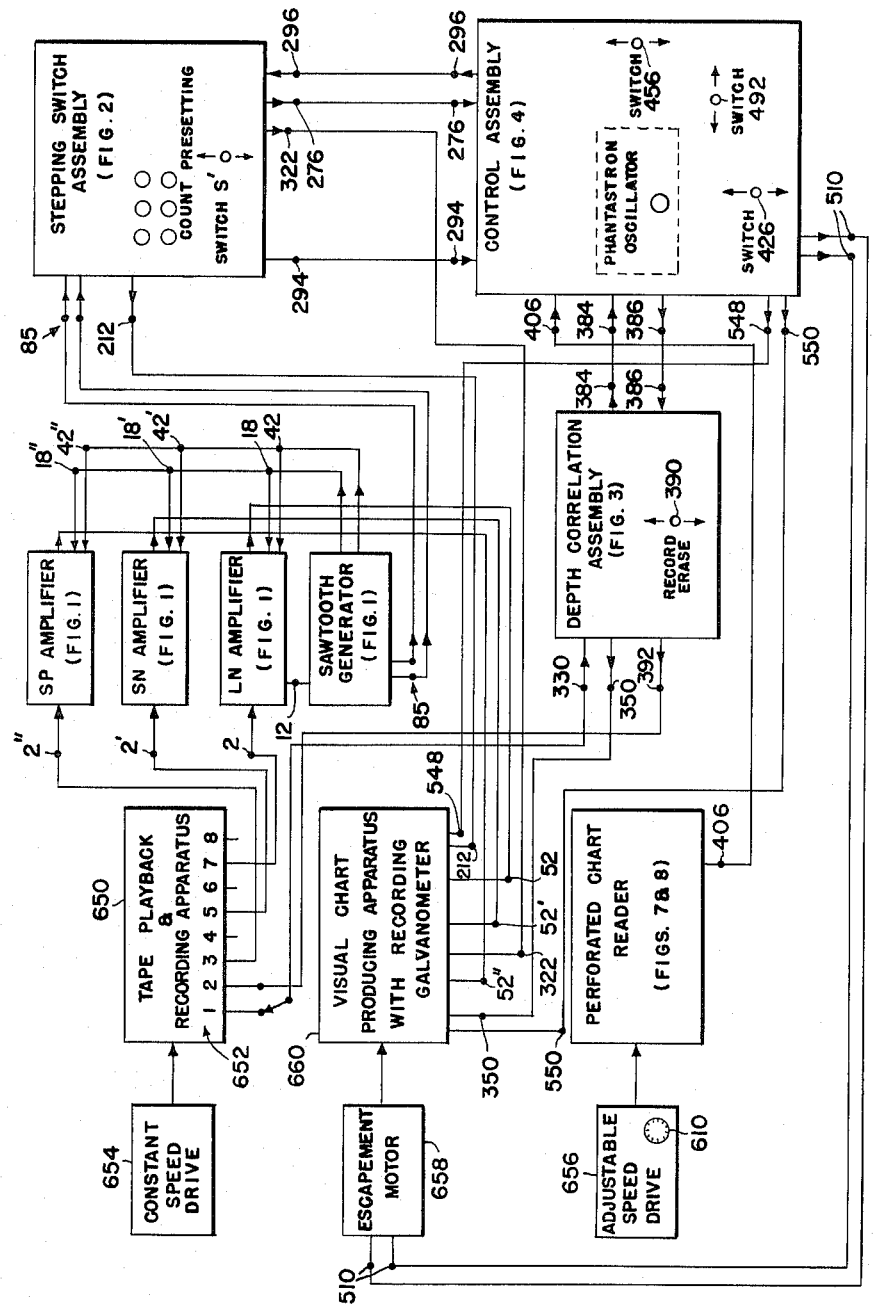

Feb. 1, 1966     J. BENNETT ETAL     3,233,214
APPARATUS FOR THE PRODUCTION OF BORE HOLE LOGS
Filed Sept. 8, 1960     9 Sheets-Sheet 8

INVENTORS
JOHN BENNETT
PRESTON E. CHANEY
JACK WEIR JONES &
FRED M. MAYES
BY

ATTORNEYS

Feb. 1, 1966     J. BENNETT ETAL     3,233,214
APPARATUS FOR THE PRODUCTION OF BORE HOLE LOGS
Filed Sept. 8, 1960     9 Sheets-Sheet 9
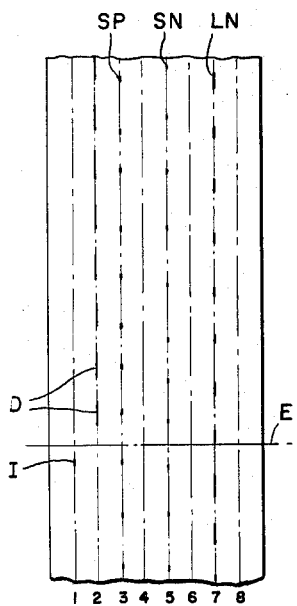
FIG. 12.
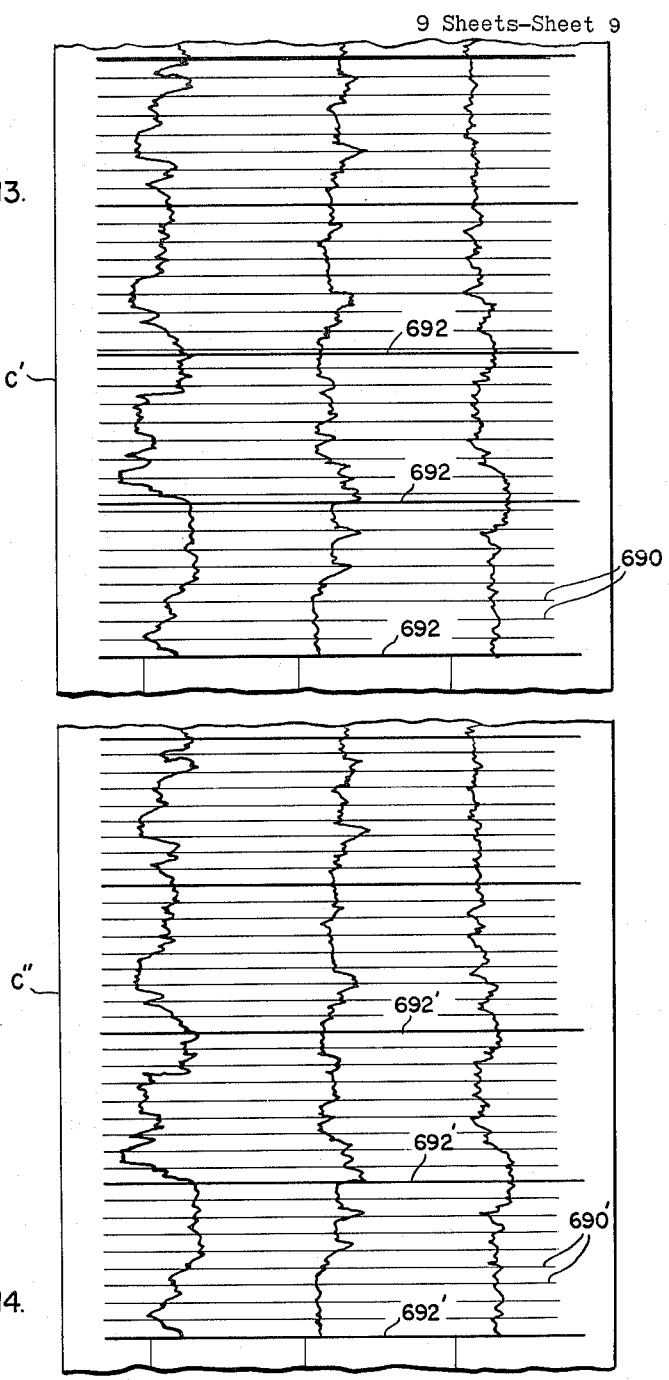
FIG. 13.
FIG. 14.
*INVENTORS*
JOHN BENNETT
PRESTON E. CHANEY
JACK WEIR JONES &
FRED M. MAYES
BY
ATTORNEYS

3,233,214
APPARATUS FOR THE PRODUCTION OF BORE HOLE LOGS

John Bennett, Richardson, Preston E. Chaney, Dallas, and Jack Weir Jones and Fred M. Mayes, Richardson, Tex., assignors to Sun Oil Company, Philadelphia, Pa., a corporation of New Jersey
Filed Sept. 8, 1960, Ser. No. 54,695
17 Claims. (Cl. 340—15.5)

This invention relates to apparatus for the production of bore hole logs, and in particular logs for visual examination derived from original records which may be produced on magnetic tape or the like within a bore hole instrument. The ultimate log provided in accordance with the invention shows variations of electrical or other properties of formations plotted against a linear depth scale.

The apparatus may be conveniently referred to as a "playback" apparatus, inasmuch as it plays back an original coded record for the production of one which may be visually examined and analyzed. This apparatus may be used in conjunction with various logging methods, but it is particularly adapted to a special logging procedure which, while having major advantages, also poses special problems in the matter of securing a visual log to a linear depth scale. The objects of the present invention will be best made clear by considering, first, the logging procedure for which it has its primary utility.

Reference may be made to the application of Fred M. Mayes and Jack Weir Jones, Serial No. 818,066, filed June 4, 1959, which discloses a logging procedure and apparatus.

Conventional methods of well logging, whether of electrical or other types, have, for many years involved the absence of the drill stem during the logging operation. This has had two serious drawbacks, in that not only was special time consumed in running the well log, during which time the drill stem had to be out of the hole, but after a period of drilling, due to the fact that the drill stem had to be removed, there was inevitably a delay before the new part of a hole could be logged, during which delay there occurred invasion of the formations by drilling liquid. Since the drilling liquid has physical properties of its own, it may, by penetration of porous layers, greatly change their properties so as to interfere with their detection. For example, in the case of electrical logging, the conductivity of the liquid would effect changes in the apparent conductivity of the formations, and in the case of acoustic logging the absorption and velocity of sound would be changed, etc.

Proposals had been made to effect electrical logging by using the drill bit or one or more other parts of the drill stem as logging electrodes. In line with this it had been proposed to supply special drill stem tubing containing one or more conductors electrically connected in the assembly of the drill stem and extending to recording apparatus at the surface. The use of such an arrangement was found to be impractical because of high cost and wear.

Proposals also have been made to support one or more electrodes on conductive cables to be lowered below a core bit into the lower portion of a hole from which the bit was raised. This procedure also proved impractical inasmuch as special handling was required at the surface and core bits were not generally desired for the major drilling activities but were used only for special purposes.

In accordance with said Mayes and Jones application (and also in accordance with an earlier Mayes and Jones application, Serial No. 683,027, filed September 10, 1957, now Patent No. 3,065,404, and disclosing an earlier version of the logging apparatus constituting the later application), logging methods and apparatus have been provided which may be used when a drill string is in a bore hole and may be used at any time with a minimum of interruption in drilling. Not only may the logging be accomplished just prior to removal of the drill string for the purpose of changing a bit, but the logging may be carried out to be promptly followed by a continuation of drilling. In accordance with said applications, a self-contained energizing and recording apparatus may be dropped through a drill string in go-devil fashion or may be pumped down therethrough when the drill string has been lifted to only a limited extent from the bottom of the hole to provide a region for reception of an electrode or other logging assembly. The apparatus particularly includes an assembly of a type suitable to pass through the mud flow openings of a jet bit which may be of any of the conventional popular types. Such bits are presently widely used since they effect the carrying away of cuttings and avoid their reworking by the drill. These jet openings are generally at relatively small angles with respect to the drill stem axis, and a flexible assembly may, accordingly, be projected therethrough to extend beneath the bit.

The self-contained assembly lowered to the vicinity of the bit contains, for electrical logging, not only means for supplying current to the earth, but also means for recording various potentials at the electrodes of the assembly.

Recording in a self-contained instrument inside a drill stem within a bore hole presents substantial difficulties. Without the possibility of reference to some standard frequency supply line, there is difficulty in providing constant speed of transport of the recording medium, most desirably a magnetic tape. Since the apparatus used must be kept to a minimum, due to the limited diametral space available, stability of measuring circuits is difficult to maintain.

As disclosed in said applications, earth excitation and recording apparatus have been provided which are self-contained and sufficiently simple in construction to be housed in apparatus which may pass through a drill stem. A pulse width or pulse displacement modulation recording system is used which is essentially independent of supply voltage changes and also of the transport speed of the recording medium, specifically a magnetic tape. Also avoided in accordance with said disclosures is the difficulty of maintaining constant current to the current electrode or electrodes. The record is dependent solely on the ratios of potentials to the current introduced into the earth, and, consequently, valid and interpretable results may be secured in view of the fact that the electrical configuration presented by the earth is linear.

It will be evident that the record obtained in this fashion is not directly readable for interpretation purposes and must be translated into a different form of visual record. This may, of course, be done in various ways so far as recording visually of magnitudes of potentials or other signals is involved.

However, there is another matter involved which is more difficult to take into account. With the apparatus carried by the bottom of a drill stem, with an electrode assembly projecting below a bit, logging is carried out by moving (usually raising) the drill stem. This raising operation is necessarily intermittent if any considerable length of the hole is to be logged, since drill stem sections must be removed after drill stem movements of extents corresponding to the lifting range of the derrick. Because there are no electrical connections between the logging apparatus and the surface, the operations of the logging apparatus cannot be conveniently or reliably controlled, and accordingly it continues to make a record even during the period in which the drill stem is not being lifted. The continuous record thus made will generally show recognizable periods of substantial variation of magnitudes of the measured signals and of essentially zero variations of such magnitudes, and consequently ultimate analysis of the record will indicate the starting and stopping of drill stem raising movements so that logged sections corresponding to various stands of drill stem may be ascertained. Time records of the starting and stopping of raising movements may be kept at the surface, and if the log is visually reproduced, there may be determined, though somewhat laboriously, a depth scale to be assigned to the log variations, with the ultimate possibility of constructing a record in which variations of signals are plotted against a linear depth scale.

For proper interpolation of such an ultimate log there must be assumed at least approximately constant advance of the tape through intervals corresponding to a single period of movement of the drill stem, and there must also be assumed a substantially constant lifting rate of the drill stem between its stops. While accurately uniform advance of the magnetic tape in the apparatus might be controlled by a clockwork mechanism, experience has shown that the advance of the tape may be considered uniform over sufficiently long but limited periods of time to make interpolation along the above lines valid. As will more fully appear hereafter, relatively slow drifts in speed of the tape may occur without invalidating the results. What is particularly significant, however, is not that the results are, practically, independent of variations of tape speed, but are independent of surface knowledge of the tape speed at the time of logging. In other words, while the tape speed must be assumed constant over each short logging interval, it is immaterial that the actual tape speed be known.

The rate of lifting of the drill stem may be controlled in practice so that during each lifting period the rate of movement is substantially constant. This is commonly achieved by the use of a governor. But it is not material that the actual rate of movement in feet per second should be known. The change of weight of the suspended drill stem as sections are removed may affect the rate of its rise, so that the actual rate may vary to a substantial extent over an extended length of the drill stem. Reference was made to the fact that indications of the starting and stopping of lifting of the drill stem will generally be observable on the reproduced tape record due to the fact that the measured signals will vary during periods of movement and will be usually constant (except for background noise) during periods of rest. When multiple records, for example of self-potential and resistivities, are being made, indefiniteness of either one or two of the records will not cause this indication on the tape to be lost. However, for even greater reliability, it has been found desirable to utilize an inertia responsive device (an accelerometer, for example) to make a further record on the tape to indicate starting and stopping of drill stem rise. The present apparatus may take such inertial records into account, though it may also be used without them.

The apparatus in accordance with the present invention has as its general objective the production of an ultimate log referred to as a linear depth scale utilizing the records made on the magnetic tape within the logging apparatus and additional records made at the surface either automatically or as manual notations, the general object being to secure the ultimate visual log without the necessity of complex computation and manual drawing of the log.

Reference herein is consistently made to logging during raising of a drill stem, and this is usually most desirable since the logging may be effected immediately following cessation of drilling and minimum raising of the drill stem only sufficiently to provide a free space below the bit for full extension of the electrode assembly; but it will be evident that logging may be carried out during lowering of a drill stem, particularly for log checking purposes, the playback apparatus being equally effective for logs thus made.

While particularly useful in conjunction with the logging apparatus and procedure just discussed, it will be evident that the apparatus may be used in conjunction with other modes of logging, as, for example, that accomplished by wire line support of a logging apparatus, though in such cases its advantages are not so marked.

Subsidiary objects of the invention particularly relating to various details of elements and operations will become apparent from the following description, read in conjunction with the accompanying drawings, in which:

FIGURE 9 is a block diagram indicating the interrelationships of the various portions of the apparatus illustrated in the preceding FIGURES 1 to 4, 7 and 8, together with other elements thereof;

FIGURE 12 is a diagrammatic illustration of a portion of the magnetic tape of FIGURE 10 with indication thereon of signals added during the second playback thereof;

FIGURE 13 is an illustration corresponding to FIGURE 11 but showing the same events reproduced in a chart resulting from a second playback of the tape; and FIGURE 14 is an illustration similar to FIGURE 13 but showing a final correction of the depth scale.

Figure 10:
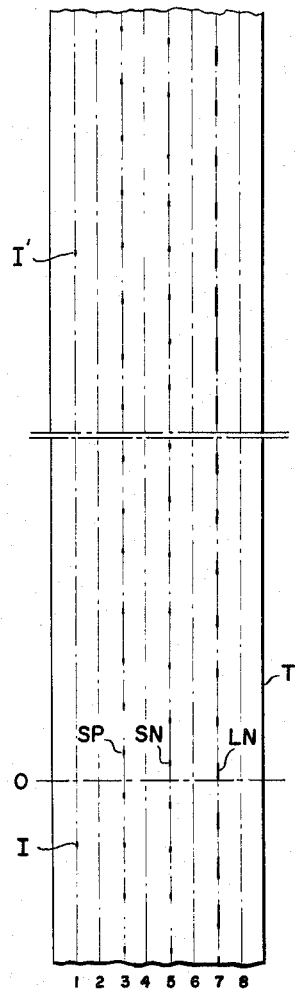
FIGURE 10 is a diagrammatic illustration of a portion of the magnetic tape as it is made during a logging operation to illustrate the nature of the magnetic records made thereon.

As a preliminary to the following discussion, reference may first be made to FIGURE 10 which diagrams a portion of the magnetic tape T taken from the logging apparatus following a logging operation. The markings on this tape indicate magnetic records in the form of dashes (long pulses) and dots (short pulses). The progress in making these records is from the bottom of the tape upwardly as here illustrated. The tape has eight recording channels numbered at the bottom of FIGURE 10, of which only four are utilized in making the original record, these being the channels bearing the odd numbers.

The channel numbered 7 contains the long pulses corresponding to the long normal log, the pulses being designated LN. The beginnings of these pulses, indicated for one of them by the designation 0, represent zeros of the successive cycles of the potentiometers described in the Mayes and Jones application, Serial No. 818,066. The length of one of these pulses compared to the length of tape between the beginning of that pulse and the beginning of the next pulse is the measurement of the magnitude of the long normal signal. As appears from the last-mentioned application, the ratio will be independent of the speed of the tape, the ratio of the two lengths alone being of significance.

The short normal pulses designated SN and the self-potential pulses SP are only short pulses, as described in said application, and their positions are referred to the zero of the long normal pulse produced in the same potentiometer cycle. Measurements of the two signals likewise depend upon the ratio of the length of tape for each of them following the zero of the long normal pulse with respect to the distance along the tape corresponding to the complete potentiometer cycle in which they are made, represented by the spacing between the beginnings of the corresponding long normal pulse and of the next such pulse. In other words, the zero line designated 0 applies to all three of the sets of pulses in the channels 3, 5 and 7.

The inertia pulses may or may not be provided, but if they are, they are recorded in the channel 1. These, of course, occur only at long intervals along the tape T, two of them being indicated at I and I', it being noted that the length of the portion of the tape T shown is broken away as indicated by the transverse lines.

For simplicity and consistency of description it will be assumed that the inertia pulses occur as short transients only at the beginnings and ends of drill stem movements giving markings as at I and I'; however, a switch highly sensitive to movement may be provided in which case during movements a varying record may be made continuously, the record ceasing only during periods of rest. The ends of such a record will, of course, then be the equivalents of the transients I and I'.

As will more fully appear, the potentiometer cycles are counted by detection of the beginnings of the long normal pulses. Reproduction is effected by conventional magnetic pickup heads, one for each channel.

The reproducing apparatus will now be described by referring to individual elements thereof in detail with discussion of their individual functions. Thereafter, these elements will be considered as complete units and described in their relationships to each other with respect to their ultimate functions only.

Figure 1:
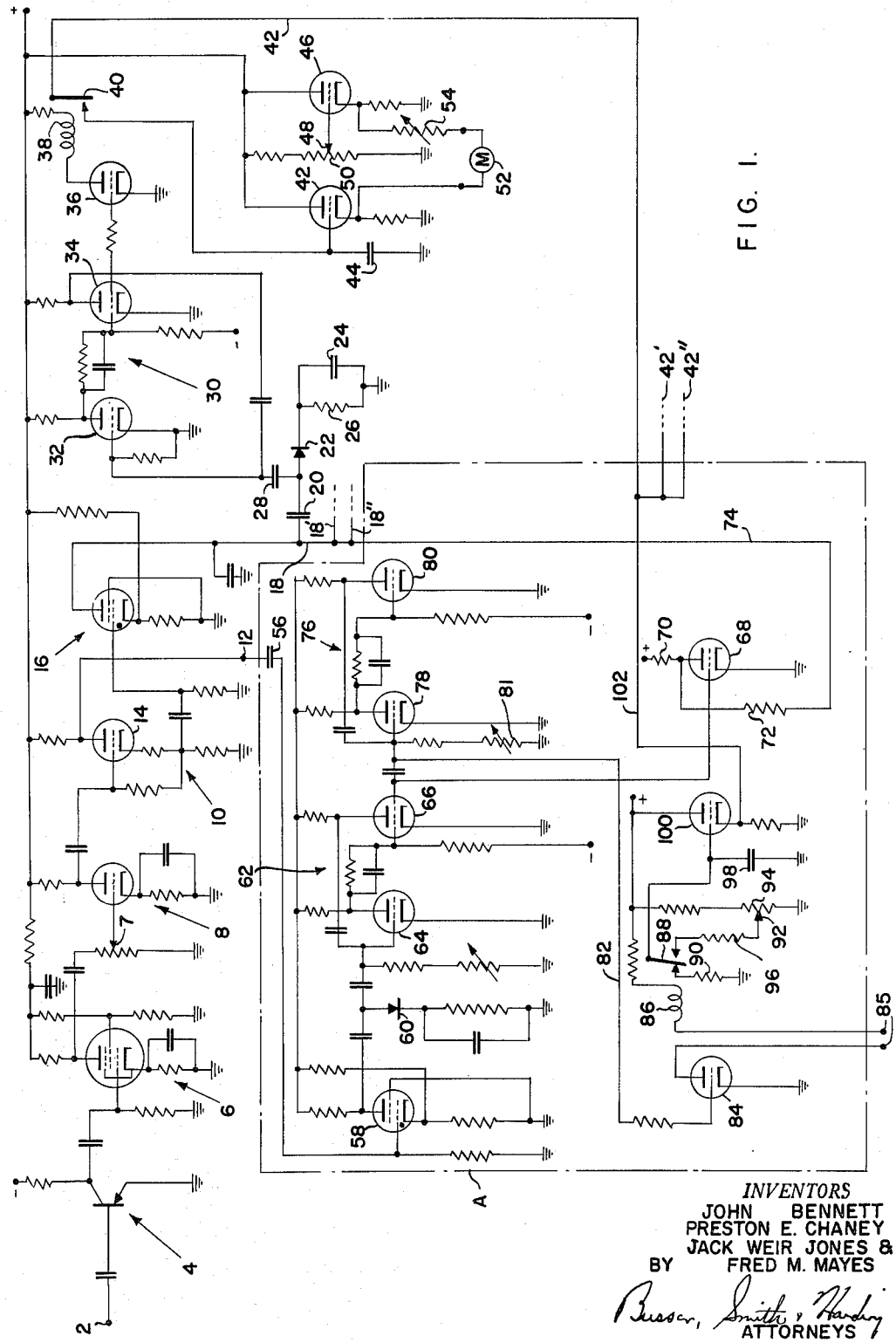
FIGURE 1 is a wiring diagram illustrating a typical amplifying and recording circuit together with some associated circuitry for the generation of a saw-tooth wave and other purposes.

Referring first to FIGURE 1, the figure shows, except for the portion enclosed by the boundary A, an amplifying and recording circuit which appears threefold in the complete apparatus. The three amplifiers respectively serve to amplify and effect the recording of the long normal, short normal and self potential signals present on the tape made during the logging operations. As just described, the long normal record on the tape comprises long pulses which have their beginnings at the first contacts of a potentiometer which is cyclically operating, and these beginnings of the dashes are utilized to provide synchronizing pulses indicative of the beginnings of the potentiometer cycles. The extents of these dashes along the tape serve to effect the visual recording of the long normal signals as deviations of a recording galvanometer channel.

In the case of the short normal and self potential records on the tape, short pulses are recorded, and their position relative to the synchronizing markers established by the beginnings of the long normal dashes serve as the measure of the short normal and self potential signals and these also give visual records, respectively, as deviations of recording galvantometer channels. These beginnings of the dashes of the long normal record serve as the common reference for the three records, and, consequently, the beginnings of these dashes on the long normal record are alone used for effecting the initiation of a sawtooth wave as hereafter described more fully. The portion of the circuitry shown in FIGURE 1 enclosed in the boundary A is concerned with the generation of a sawtooth wave and with other control activities, and is triggered only from the long normal amplifier. Consequently, FIGURE 1 shows specifically the long normal amplifier and its connections, but it will be understood that the other two amplifiers are identical in construction and operation, with the exception of the special output derived from the long normal amplifier; i.e., the circuitry at A is omitted from the latter amplifiers.

The input from the reproducing head associated with the long normal channel of the tape is provided at 2 to a conventional transistor amplifier stage 4 and further amplification is effected in the following conventional amplifier stages 6 and 8, provision being made at potentiometer 7 to control the amplification. The amplifier at 8 is followed by a phase inverter stage 10 which provides from its anode and cathode connections two signals of opposite phases. The signal from the anode of the triode 14 of this stage is provided to a terminal 12 which controls the operation of the circuitry located within the boundary A. This connection is made only from the long normal amplifier, there being no similar connection from the short normal and self-potential amplifiers. The cathode connections of the triode 14 deliver signals to the control grid of the thyratron arrangement indicated at 16. The anode of the thyratron is connected at 18 to a special control portion of the circuit within boundary A as will be hereafter described. For the present, it may be said that so far as transmission of signals is concerned the thyratron has an anode resistor in its supply connection so that when it is fired a negative pulse is provided from its anode through capacitor 20 and thence through capacitor 28 to a monostable multivibrator indicated generally at 30. To insure that only negative pulses affect the multivibrator, there is connected between the capacitors 20 and 28 the arrangement of diode 22 to pass positive pulses to a grounded capacitor 24 shunted by a resistor 26.

The multivibrator 30 has a conventional construction, comprising the triodes 32 and 34 with their respective anodes and grids cross-connected and connected to the direct current supply terminals so that the triode 32 is normally conducting while the triode 34 is normally cut off. Circuit constants are so chosen that when the multivibrator is flipped to its astable state it remains therein for only a short interval, then returning to its stable state. This short interval determines the duration of a sampling pulse which through the connection between the grid of triode 34 and the grid of triode 36 serves to operate momentarily a relay 38 to cause closure of its contacts at 40. Such closure occurs for a very short interval while the grid of triode 34, and thus of triode 36, is positive during the astable state of the multivibrator. The movable contact at 40 is connected at 42 to the circuitry within the boundary A.

The fixed contact at 40 is connected to the grid of a triode 42 and to one terminal of a potential accumulating capacitor 44 the other terminal of which is grounded. The triode 42 is arranged as a cathode follower; and the same is true of a second triode 46, the grid of which is connected to the contact 48 of a potentiometer 50 connected between the positive supply terminal and ground. Between the cathodes of the triodes 42 and 46 there is connected the recording galvantometer element 52 in series with an adjustable resistor 54. The adjustment of potentiometer contact 48 serves for zero setting of the galvanometer element while the adjustment of resistor 54 serves as a sensitivity control. The galvanometer elements 52 of the three amplifiers referred to above provide visual traces of the long normal, short normal and self potential signals, respectively.

Consideration may now be given to the circuitry enclosed in the boundary A. The terminal 12, associated with the long normal amplifier only, as mentioned above, is connected through capacitor 56 to deliver a positive pulse at each synchronization instant to the control grid of a thyratron 58 connected in a conventional circuit to be fired by such pulse. Due to the fact that the synchronization pulse might be associated with spurious transmission of pulses which might give rise to false measurements, actual initiation of certain operations is desirably slightly delayed beyond the instant of this synchronization pulse, and consequently there is provided a time delay arrangement through the use of a monostable multivibrator indicated at 62. This comprises a pair of triodes 64 and 66 with the usual criss-cross connections of anodes and grids and connections to the supply terminals so that in its stable state the triode 64 is normally conducting and the triode 66 is normally cut off. Following an actuation, the astable state may be quite short (negligible in duration as compared with the cycle period between the beginnings of long normal pulses during reproduction, i.e., only a few milliseconds), but sufficient to subtend the short period of the undesired transients. Tripping of this multivibrator is provided by the delivery of a negative pulse from the anode of thyratron 58 when it is fired. The diode arrangement at 60 is provided to prevent the transmission to the grid of triode 64 of positive pulses.

During the duration of the astable state of multivibrator 62, the grid of triode 66 is positive and by connection to the grid of a triode 68 produces conduction of this triode, the anode of which is connected to a positive supply terminal through a load resistor 70 and is connected through a relatively high resistor 72 to the connection 74 joined to the connection 18 running to the anode of the thyratron 16. This connection is also made as indicated at 18' and 18" to the anodes of the thyratrons corresponding to 16 in the short normal and self-potential amplifiers. The purpose of these connections is to so reduce the anode potentials of the thyratrons as to prevent their firing under the action of spurious positive pulses delivered to their control grids. This result is achieved by the fact that due to heavy current drawn by the triode 68 the anode of that triode is at relatively low positive potential, serving to provide only a low positive potential to the anodes of the thyratrons.

Returning to the multivibrator 62, when the grid of triode 66 again becomes negative at the end of the astable period of this multivibrator, there is tripped a second multivibrator 76 which comprises the triodes 78 and 80 in their usual connections, the triode 78 being normally conducting and the triode 80 normally non-conducting. This multivibrator has constants so chosen as to have a relatively extended astable period comparable in length to that between synchronizing pulses. When, during the astable state of multivibrator 76 the grid of triode 78 is negative, the grid of triode 84 is likewise negative by reason of the connection 82 between these grids. The triode 84 contains in its anode circuit the winding of a relay 86 and, connected between the terminals indicated at 85, the winding of another relay which will be referred to hereafter. When the triode 84 is cut off by the negative potential of its grid during the astable state of multivibrator 76, its movable contact 88 is released to engage the right hand fixed contact which is connected through a high resistance 96 to the adjustable contact 92 of a potentiometer 94 connected between the positive supply line and ground. Thus a charging current is provided through the resistor 96 to the capacitor 98, the ungrounded terminal of which is connected to the grid of the cathode follower 100. When the relay 86 is energized during the stable state of the multivibrator 76 discharge occurs through the low valve resistor 90. A sawtooth wave is thus produced during each astable period of the multivibrator 76, and the potential appearing on capacitor 98 is transmitted by way of the cathode follower through the connection 102 running to the connection 42 of the long normal amplifier and through corresponding connections 42' and 42" to the short normal and self-potential amplifiers. It is this sawtooth wave which is sampled by the momentary connection effected at the contacts 40 through operation of relay 38, the potential thus sampled being applied to the capacitor 44. It may be noted that using a high value resistor at 96 results in an ultimate charge of capacitor 98 at the end of the sawtooth to a potential which is only a small fraction of the potential at 92 so that the part of the charging characteristic used is approximately linear thus improving the linearity of the galvanometer deflection with respect to the magnitude of the logging signal picked up by the logging apparatus.

A resumé of what has been described with reference to FIGURE 1 may be made as follows:

In the case of the long normal amplifier, the beginning of a dash, representing the synchronizing instant, provides a positive pulse at terminal 12 to fire thyratron 58 and initiate the quite short astable condition of the multivibrator 62 which effects desensitizing of the thyratron 16 thus preventing during this short period any possibility of a spurious sampling of the potential of the connection 2. At the end of this short astable period, the multivibrator 76 is flipped to its astable state which it retains for substantially the remaining duration of the cycle period. The beginning of this astable period starts the production of a sawtooth wave which appears at the movable contact 40 of the relay 38. After an interval depending upon the length of the dash on the long normal record, the end of that dash fires the thyratron 16 by applying a positive pulse to its control grid, with resulting momentary closure of the contact at 40 through the short astable period of the multivibrator 30. The sample of the sawtooth thus produced charges the capacitor 44, which is of small capacitance, to the sawtooth potential at that time, and since the potential of the capacitor 44 continues constant thereafter, the cathode followers 42 and 46 provide a current between their cathodes deflecting the recording galvanometer 52. At the end of the astable period of the multivibrator 76 the relay 86 effects substantially complete discharge of the capacitor 98 thus restoring conditions for the initiation of the next sawtooth. The operation for the short normal and self-potential circuits is similar, the same sawtooth being sampled to produce deflections of their galvanometers to provide a measure of the signals on the corresponding channels, these signals being derived from the short duration pulses in those channels.

Summarizing what has been above described, the three amplifiers receive signals from the long normal, short normal and self-potential reproducing heads, and provide through galvanometers 52, 52' and 52" (see connections so designated in FIGURE 9) signals whose amplitudes correspond to the signal amplitudes picked up by the electrodes during logging. The inter-amplifier connections 18' 18" control thyratron operations to prevent misfiring as described above. The inter-amplifier connections 42' 42" provide the sawtooth wave from the long normal amplifier auxiliary circuit A to the other two amplifiers at their relay contacts corresponding to 40.

The only signal delivered externally from the assembly consisting of the three amplifiers is through terminal 85, which signal is a pulse of current interruption corresponding to the duration of the sawtooth wave.

Figure 2:
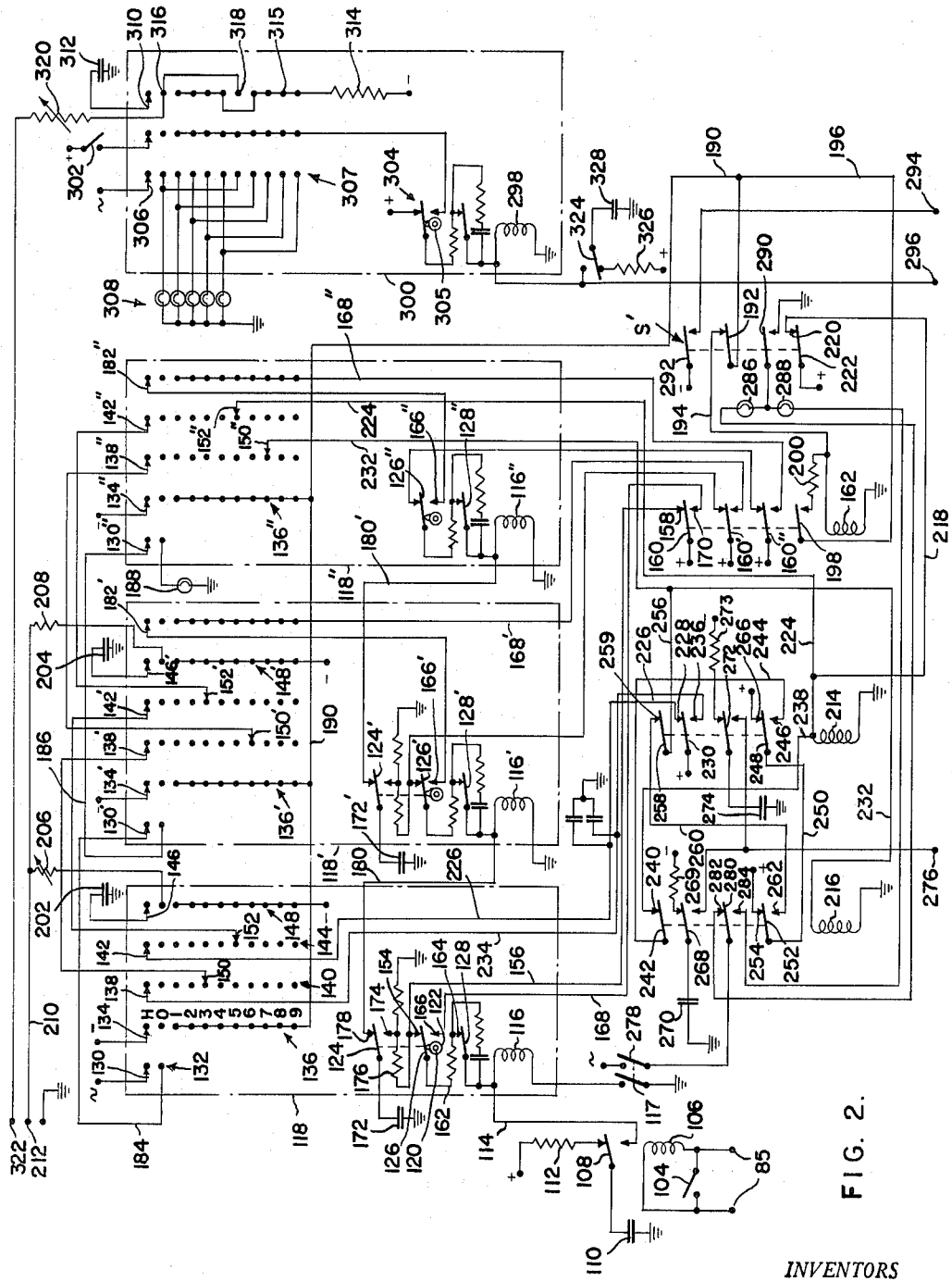
FIGURE 2 is a wiring diagram showing further circuitry of the apparatus particularly involved in pulse counting and control, the matters shown in this figure being hereinafter referred to as the stepping switch assembly.

Reference may be now made to FIGURE 2 which may be conveniently referred to as the stepping switch assembly. The terminals 85 referred to in the description of FIGURE 1 are connected to the winding of a relay 106 which is thus in series with the winding of relay 86. A switch 104 is provided to short the relay winding 106 so that the apparatus of FIGURE 2 may be made inoperative while that of FIGURE 1 remains operative. The movable contact 108 of this relay is connected to one terminal of a capacitor 110, the other terminal of which is grounded, and when the relay 106 is deenergized the upper contact is made through resistor 112 to the positive supply terminal whereby the capacitor 110 is charged. When the relay 106 is energized, the capacitor is discharged through the lower contact and connection 114 through the stepping switch solenoid 116 which has a ground return through a switch 117 which is closed during normal operation. It may be noted that relay 106 is deenergized during the duration of a sawtooth. This, as will become apparent, provides a step of a stepping switch approximately coinciding with the beginning of each sawtooth.

The solenoid 116 is the operating solenoid of a units stepping switch 118. There are two additional stepping switches of the same type indicated at 118' and 118", respectively counting tens and hundreds of units. Since these stepping switches may be of similar construction and involve common aspects of operation, it will be convenient at this time to describe them and their stepping operations which are, per se, essentially conventional. In view of the fact that they are basically the same, the units stepping switch 118 will be described in some detail, the description applying also to the other two of these switches.

The switches themselves are of conventional rotary type involving, for 118, a shaft 120 which is stepped about by the intermittent energization, and deenergization of solenoid 116. As is conventional the solenoid 116 when energized tensions a spring. When the solenoid is deenergized the spring through the action of a pawl imparts a step to the shaft 120 to advance rotary contact elements. These contact elements have what may be called a home position indicated at H and ten additional positions respestively indicated at 0 to 9, inclusive, in the left hand portion of the stepping relay 118. While these positions are illustrated as developed in this figure, it will be understood that in the step following position 9 the home position H is assumed. The operation, accordingly, is cyclic.

When the shaft 120 is in home position, a cam 122 provides upper contacts of a pair of movable switch elements 124 and 126. In all other positions these switch elements occupy their lower positions. The solenoid 116 also operates a movable contact 128, which is moved normal downwardly, as illustrated, when the solenoid 116 is energized.

A plurality of stepping switch elements is provided. One of these indicated at 130 makes contact with fixed elements of a group 132 of which only two are used as indicated in the diagram. A second movable contact 134 engages the fixed contacts of a group 136, of which those in the positions 1 to 9 are connected together. Third and fourth movable contacts 138 and 142 engage fixed contacts of the groups 140 and 144, respectively. Another movable contact 146 engages the fixed contacts of the group 148, of which those in positions 1 to 9, inclusive are connected to a negative supply terminal. For simplicity of illustration, manually adjustable contacts are shown at 150 and 152 arranged to be independently selectively engaged with the contacts in positions 0 to 9 of the groups 140 and 144. In actual physical construction, 150 and 152 are manually adjustable contacts of rotary switches having their ten fixed contacts (of each) electrically connected, respectively, to those of the groups 140 and 144. It may be here remarked, as will be brought out more fully later, that the manually adjustable contacts 150 and 152, and corresponding manually adjustable contacts 150', 152', 150", and 152" of the tens and hundreds assemblies are provided for the purpose of presetting counts.

The upper fixed contact 154 of the switch 126 is connected at 156 to the upper fixed contact 158 engageable by a movable contact 160 of a relay, the winding of which is indicated at 162. The movable contact 160 is connected to a positive supply terminal. Movable contact 160 engages the upper fixed contact 158 when the winding of this relay is deenergized.

The switch element 126 has a connection at 162, including a current-limiting resistor, to the upper contact 164 engageable by the movable contact 128 when the solenoid 116 is deenergized. The lower fixed contact 166 of the switch element 126 is connected at 168 to the lower fixed contact 170 engageable by the movable contact 160 when the relay 162 is energized.

Sufficient description of the connections of the units relay has now been provided to form a basis for consideration of its fundamental operations which are as follows:

Assuming power to be supplied to the supply terminals, but relay 162 to be deenergized, the movable contacts of the stepping relay 118 may be initially assumed to be in the home or H position. Current is then supplied from the positive supply terminal through contacts 160 and 158, connection 156, contacts 154 and 126, connection 162, and contacts 164 and 128 to energize the solenoid winding 116, assuming switch 117 to be closed. The result is energization of solenoid 116 immediately followed by deenergization as the movable contact at 128 is pulled away from fixed contact 164. Accordingly, there is an immediate step of the movable contacts of the relay from home to the zero position. This zero position is maintained, because the resulting rotation of shaft 120 releases the movable contacts 124 and 126 to their lower positions. The zero position may then be regarded as the actual rest position of the stepping relay during ordinary operation. In all positions except the home position H, the movable switch element 126 engages the fixed contact 166. This last contact 166 is connected through line 168 to the lower contact 170 which is deenergized so long as the relay 162 is deenergized.

After the attainment of the zero position of the stepping switch contacts, steps are imparted to the stepping switch 118 only when the movable contact 108 is moved to its lower position by the energization of relay 106 from the terminals 85 to provide a discharge of capacitor 110 through the solenoid 116 the stepping occurring when the capacitor discharge ends. Step by step advance of the relay 118 accordingly takes place each time a power pulse provided at terminals 85 is terminated, which is between successive sawteeth of the circuitry of A of FIGURE 1, and accordingly, as an ultimate result, the long normal pulses of the tape are counted in the units stepping switch. The introduction of a pulse at 85 following attainment of the step position 9 will advance the stepping switch 118 to the home position H. But when it does so, the switch element 126 is moved to its upper position by the action of cam 122, resulting in the provision of an additional pulse to the solenoid 116 originating at 160, with the result that the switch immediately moves to position 0 without the introduction of a pulse through connection 114. During the counting, therefore, the home position H of the stepping switch is merely a transient position, the effect of a single pulse originating through connection 114 being to cause a step from the nine position to the zero position. The position H is thus not involved in the counting though, as will presently appear, it effects other results.

The normal stepping having been described, reference may now be made conveniently to the homing operation, which results when the solenoid 162 is energized. If the stepping switch is in other than home or zero position, energization of relay 162 will result in engagement of movable contact 160 with fixed contact 170. (The zero position is here excluded only because of another condition described hereafter; if the relay 162 were actually energized with the switch in the zero position homing therefrom would occur.) Since under the conditions stated, the switch element 126 engages contact 166, power is supplied to the contact 164 through connection 162, producing a vibrating action of the movable contact 128 and pulses of energization of the solenoid 116. On the occurrence of each pulse, through the tensioning of the driving spring and then its release, the stepping relay 118 is rapidly advanced until the home position H is reached, whereupon the cam 122 moves the switch element 126 upwardly to terminate the homing action. The switch accordingly stops in the H position until the relay 162 is deenergized, whereupon it will immediately step to the zero position as indicated above.

The foregoing are the normal stepping and homing operations of relay 118, and these basically also supply to the stepping relays 118′ and 118″, assuming stepping pulses to be applied to the solenoids 116′ and 116″ as will be shortly mentioned. The diagram in FIGURE 2 will indicate that the connections of these relays are similar to those of relay 118 and the connections need not be described in detail, corresponding parts, however, being indicated by the priming or double priming of the numerals shown in connection with relay 118. There is, however, one minor exception involved in the homing action will respect to the tens and hundreds relays, in that the connections 168′ and 168″ include the stepping contacts 182′ and 182″, respectively, which complete these connections only when in the positions 1 to 9, inclusive. If the relays 118′ and 118″ are in zero position at the beginning of a homing operation, due to energization of relay 162, these relays 118′ and 118″ remain in their zero positions.

Reference may now be made to the carrying of steps from the units stepping relay to the tens stepping relay and from the tens stepping relay to the hundreds stepping relay. A capacitor 172 is connected between the movable switch element 124 and ground, and when the relay 118 is in other than its home position H, contact is made between 124 and 174 and the capacitor 172 is charged through connection 156 and resistor 176. When the relay 118 moves to its home position, the movable contact 124 is lifted to engagement with the contact 178, and capacitor 172 is then discharged through solenoid 116′ to impart a step to relay 118′. It will be noted that occurrence of this step corresponds to the transition of the units relay from 9 to 0 through the transient step H. A similar action takes place in the way of a production of a pulse to the solenoid 116″ when the tens relay 118′ passes through the position H in going from position 9 to position 0. It will accordingly be evident that the three relays provide a count from 0 to 999 and then repeat their counting cycle. As will become evident hereafter, thousands digits of counts will not be subject to confusion, and therefore there is no necessity for providing a larger counting range of the system.

Reference may now be made to certain minor operations playing relatively small parts in the overall operation of the system.

The movable contact 130 is connected to a low voltage alternating current supply terminal and when relay 118 is in zero position the alternating potential is applied through connection 184 to the movable contact 130′ of the relay 118′. If this relay also is in zero position the supply is passed through connection 186 to the movable contact 130″ of the hundreds relay, and if this also is in zero position an indicating lamp 188 is illuminated. The purpose of this lamp is to indicate to an operator that the three stepping relays are in proper position to start a count.

The movable contacts 134, 134′ and 134″ which engage, respectively, the rows of fixed contacts 136, 136′ and 136″, are connected to negative supply terminals to provide current through connection 190 whenever any one or more of the relays are in the positions 1 to 9. When the movable switch contact 192 of a ganged switch S′ is in its upper position illustrated in FIGURE 2, this provides energization to the relay winding 162, to effect a homing operation. To insure a complete homing operation there is provided the contact 198 of relay 162 which, when the relay is once energized, maintains it energized through the connection including the current-limiting resistor 200. As a result, once the homing operation is started it is completed irrespective of downward movement of switch S′, being terminated when all of the relays reach their home position. It may also here be noted that homing by closure of switch 192 does not occur if the relays, including 118, are in zero position, since, then, the connection 190 is not energized. Unnecessary homing and also spurious results are thus avoided.

For the purpose of providing indications of groups of ten and groups of hundreds of pulses, it is desirable to drive a galvanometer through one deflection for every count of ten pulses and through a larger deflection for every count of one hundred pulses. This result is effected through the movable contacts 146 and 146′ whenever they reach the zero position. It will be noted that the fixed contacts 148 and 148′ with which these movable contacts respectively engage involve the connection of those in positions 1 to 9 to negative supply terminals. When the movable contacts are in any of these positions the respective capacitors 202 and 204 are charged, and when the movable contacts 146 and 146′ reach their zero positions, these capacitors are respectively discharged through the resistors 206 and 208 and terminal 212 connected to a galvanometer. One of the resistors, 206, is desirably adjustable so that the impulses imparted to the galvanometer on every count of ten are less than those applied on the counts of one hundred, to enable the pulses to be distinguished on a record.

The primary objective of the counters so far described is the provision of output signals when predetermined counts of pulses provided at 85 have been attained. In order to facilitate operation, it is desirable to provide an arrangement in which, while one set of counts is being accumulated, there is the possibility of an operator's entering into the apparatus a new predetermined count value for a subsequent pulse count. To accomplish this end there are proivded two relays 214 and 216 which constitute a flip-flop arrangement with one "active" while the other is "inactive" so that they alternately determine the counting operations. Each of these relays comprises a winding which is grounded at one end. Connected to the ungrounded end of the relay winding 214 through line 218 is an upper contact 220 engageable by a switch arm 222 which is ganged with the switch arm 192 previously described. The switch arm 222 is connected to a source of positive potential. Connected also to the ungrounded terminal of winding 214 is the line 224 which runs to the manually adjustable switch contact 152″. Connected to the movable contact 142 of the stepping relay 118 through the connection 226 is a fixed relay contact 228 engageable by the movable contact 230 of the relay 214, which movable contact is connected to a positive supply terminal. To the manually adjustable contact 150″ there is connected, through the line 232, the ungrounded terminal of the winding of relay 216. A line 234 connects the movable contact 138 of the units stepping switch 118 to a lower fixed contact 236 engageable by the movable contact 230 when the relay 214 is energized.

The ungrounded terminal of relay winding 214 is also connected at 238 with the fixed contact 240 engaged by the movable contact 242 of relay 216 when the latter is deenergized. This movable contact 242 is connected at 244 with the fixed contact 246 engageable by the movable contact 248 when the relay 214 is energized. This movable contact 248 is in turn connected at 250 with the movable contact 252 which when the relay 216 is deenergized engages the fixed contact 254 connected to a positive supply terminal. Connections similar to that just described and symmetrical with respect to the two relays 214 and 216 are provided by the connection 256 to the ungrounded terminal of relay 216, running to the movable contact 258 of relay 214 engaging, when this relay is deenergized, a fixed contact 259 connected at 260 with a fixed contact 262 which is engaged by the movable contact 252 when the relay 216 is energized. An upper fixed contact 266 for the movable contact 248 is joined to a positive supply terminal.

When the relay 216 is deenergized, a movable contact 268 thereof occupies an upper position to effect charging from a negative potential terminal through a resistor 269 of a capacitor 270 having its left-hand terminal grounded. Similarly when the relay 214 is deenergized a movable contact 272 in its upper position provides charging from a negative supply terminal through a resistor 273 of a similarly arranged capacitor 274. When either 214 or 216 first becomes energized, the corresponding capacitor provides an output signal to a terminal 276 by discharge of the corresponding capacitor. The terminal 276 thus provides an output pulse each time one or the other of the relays is energized, the pulse being a transient one due to condenser discharge.

When switch 278 is closed, a low voltage alternating supply terminal is connected to a movable contact 280 of the relay 216 which selectively engages fixed contact 282 or fixed contact 284 depending upon whether the relay is deenergized or energized. These fixed contacts are connected to a pair of lamps 286 and 288, a common junction of which is grounded when there is moved downwardly the switch element 290 ganged with the elements 192 and 222. These lamps serve to provide an indication of which of the alternative counting systems is in operation. A fourth switch 292 ganged with the others is connected to a negative supply terminal and provides an output at 294 when moved downwardly.

The operation of what has been described is as follows:

When the group of switches 192, 222, 290 and 292, which will be hereinafter collectively designated S' are in raised position, homing of the stepping relays occurs as has been described, and relay 214 is energized, 216 being deenergized as will become obvious. Under these conditions the movable contacts of the relay 214 occupy their lower positions. Once the relay 214 is thus energized, it is held energized by a second circuit which may be traced from its upper terminal through connection 238, fixed contact 240, movable contact 242 (of the deenergized relay 216), connection 244, fixed contact 246, lowered movable contact 248, connection 250, movable contact 252, and fixed contact 254 running to a positive supply terminal. At the same time all energizing connections to the relay 216 are open. For operation, the grouped switches S' are moved to their lower position, but the relay 214 remains energized as just described. Counts are now accumulated by the stepping relays 118, 118' and 118", and nothing now occurs until the accumulation takes place to the extent that movable contact 138 engages the same contact point as is connected to the adjustable contact 150 and the same occurs with respect to the contacts 138' and 150' and with respect to the contacts 138" and 150". As will be noted, adjustable contact 150 is connected to the stepping contact 138' and adjustable contact 150' is connected to the stepping contact 138". As a result when the aforementioned accumulation takes place, i.e., when the counts accumulate to correspond to the setting of adjustable contacts 150, 150' and 150", there is a direct connection between 138 and 150", which reults in energization of the relay 216. The connections for this energization may be traced from the upper terminal of the winding of relay 216 through connection 232 to adjustable contact 150", and thence through its connections, just described, to stepping contact 138, through connection 234, fixed contact 236, movable contact 230, which is now in lower position, and to the positive supply terminal. This energization of relay 216 deenergizes the relay 214 by the opening of the contact between 240 and 242. At the same time a pulse is emitted through terminal 276 by the discharge of capacitor 270. The conditions of the two relays 214 and 216 are now reversed.

During the stepping culminating in the energization of the relay 216, the second set of manually adjustable contacts 152, 152' and 152" may be set to provide for another predetermined count accumulation. The counts originating in terminals 85 in FIGURE 2 continue, and when the total counts rise to the predetermined value just mentioned, the relay 214 is energized and the relay 216 deenergized. The specific connections here involved need not be described because it will be evident from the description of the connections that they are symmetrical with respect to the two relays with the exception of the connection of relay 214 to the switch element 222. If this latter continues in its lowered position, the two relays are alternately energized, becoming deenergized when the respective counts reach the values predetermined by the setting, on the one hand, of contacts 150, 150' and 150" or, on the other hand, of contacts 152, 152' and 152". When one or the other of relays 214 or 216 is energized a pulse is emitted at terminal 276 from the discharge of either capacitor 270 or 274. The functions of these pulses are described hereinafter. It will now be evident that the counting of pulses may be continuous, since the two sets of stepping contacts are alternately effective and during the stepping of one a predetermined setting may be made for the other and vice versa.

The overall operation of what has been described may be simply stated by saying that the counts introduced at 85 provide output pulses at terminal 276 when predetermined successive counts are attained. Concurrently, on each tenth count a galvanometer deflection of relatively small amplitude occurs and on each hundredth count the deflection is of relatively greater amplitude.

Also shown in FIGURE 2 is another stepping switch indicated at 300 which receives its stepping pulses from a terminal 296 connected to the ungrounded end of its operating solenoid 298. This stepping switch may be of the same form as those previously described, and it will be evident from its connections that provision is made for homing by the closure of a switch 302 connected to a positive supply terminal, while the extra step required to provide a movement from the ninth step position through the homing position to zero is provided by the switch arrangement at 304 controlled by a cam on its operating shaft 305. A stepping contact 306 of the switch 300 is connected to a low voltage alternating supply terminal and, by stepping engagement with fixed contacts indicated at 307, there are illuminated the lamps 308 which are so connected, as shown, as to be successively illuminated in the count from 0 to 4 and then in the count from 5 to 9. The purpose of this arrangement will be described later.

A stepping contact 310 is connected to a capacitor 312, and is engageable with fixed contacts 316 and 318, connected together and located in the zero and five positions and contacts indicated at 315 in the other numerical positions which are connected together and through a resistor 314 to a negative supply terminal. It will be evident that as stepping takes place the capacitor is charged during the step positions 1 to 4 and 6 to 9, and is discharged at positions 5 and 0, the discharge taking place through the adjustable resistor 320 connected to a galvanometer terminal 322.

Provision is also made for a manually controlled stepping of the relay 300 by the provision of a switch 324 which, in its lower position, effects charging of a capacitor 328 from a positive supply terminal through resistor 326, and when in its upper position effects discharge of this capacitor through the solenoid 298 to provide a step of the relay. Accordingly by successive upward movements of the switch 324 the stepping relay 300 may be set to any desired position.

As will appear more fully hereafter, the purpose of the relay 300 and its connections is to provide on a chart depth markings to identify the log traces with depth. Such markings may, for example, appear at ten foot intervals. The purpose of the manual stepping control switch 324 and of the lamps 308 is to permit manual presetting of the depth markings to proper correspondence with the log traces.

Figure 3:
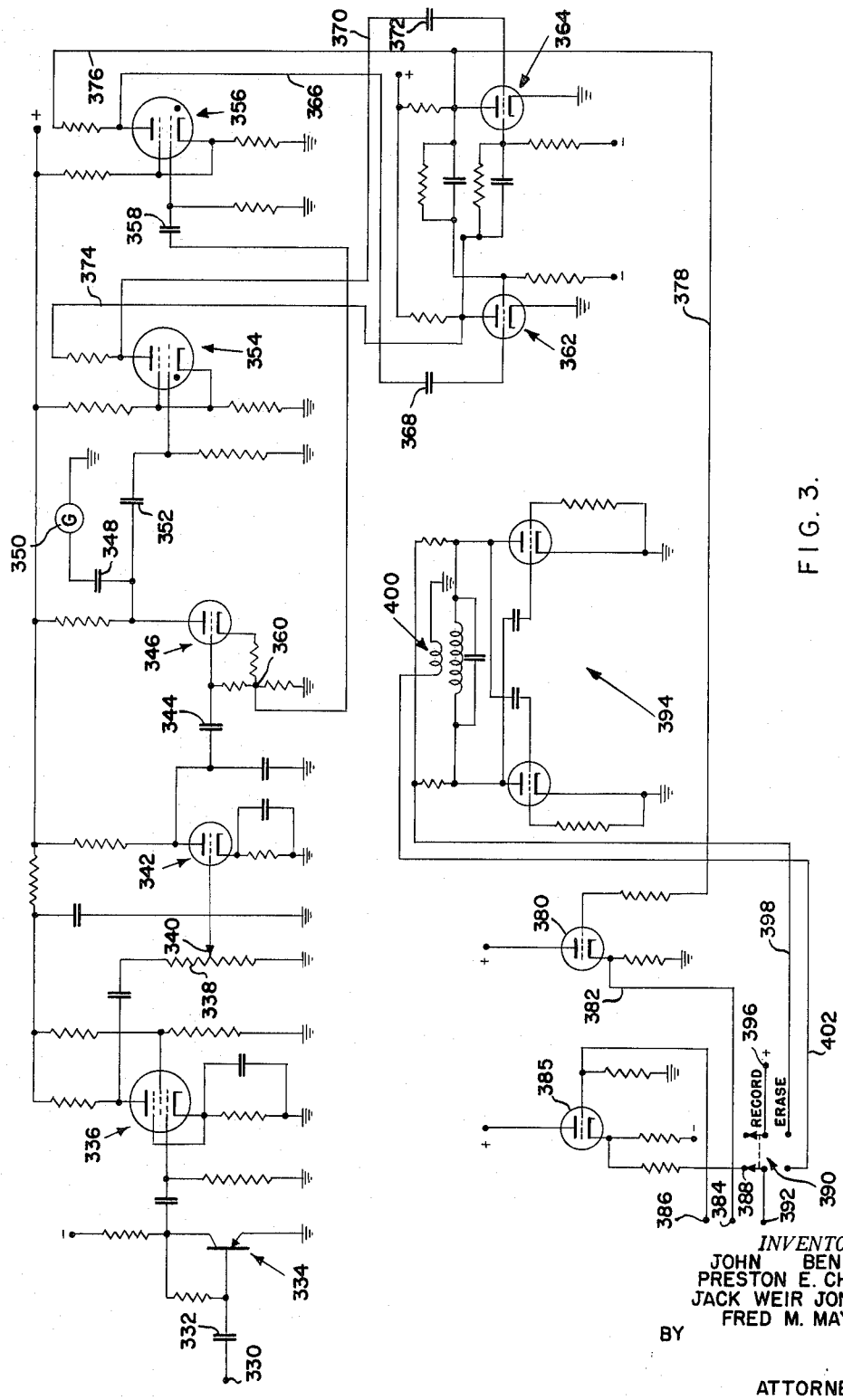
FIGURES 3 and 4 are further wiring diagrams showing other portions of the apparatus having to do with depth correlations, the matters in FIGURE 3 being hereinafter referred to as the depth correlation assembly, and those in FIGURE 4 as the control assembly.

The circuitry shown in FIGURE 3 has a number of functions but may be conveniently referred to as the depth correlation assembly. One of its functions involves the following:

As has been indicated, the record made in the hole contains transient pulses I (FIGURE 10) arising from the operation of an inertia switch when the movement of the logging apparatus is started and interrupted; or alternatively there is produced a record of continuous vibrations during movement interrupted during quiescent periods of the drill stem. In the playback apparatus a pick-up heat reading the trace containing these transients I, or other records of movements, is connected during an initial playback to the terminal 330 to deliver signals through capacitor 332 to a conventional transistor amplifying stage 334 which is followed by a pentode amplifying stage 336, which in turn feeds the signal to a potentiometer 338 provided with an adjustable contact 340 for amplitude control. The signal then passes to the triode amplifying stage 342 which feeds the amplified signal through capacitor 344 to the phase inverting stage 346. The triode in this stage provides an output through capacitor 348 to the recording galvanometer element 350 which records the inertia switch pulses on the log chart, as more fully described hereafter. In this function the portion of FIGURE 3 already described merely functions as a convenient amplifier.

In a second function of the circuitry of FIGURE 3, the terminal 330 alternatively receives pulses recorded on the tape in one of the originally empty channels during the playback operations at the surface. Amplification of these pulses takes place in the fashion just described up to the triode 346, but this time the galvanometer 350 is disconnected.

Connection from the anode of the triode 346 is also provided through capacitor 352 to the control grid of the thyratron 354. A companion thyratron 356 has its control grid connected through capacitor 358 to the point 360 of a cathode network of the phase-inverting stage.

The signals resulting from the connection of the terminal 330 now under discussion are well defined positive and negative pulses and the thyratrons 354 and 356 are alternately fired, respectively, by the positive and negative signals. A bistable multivibrator is provided by the triodes 362 and 364 with conventional cross-connections of their anodes and grids. The anode of thyratron 356 is connected at 366 through the capacitor 368 to the grid of triode 362, while the anode of thyratron 354 is similarly connected at 370 through capacitor 372 to the grid of triode 364. The respective negative pulses at the thyratron anodes resulting from their firing provide the transition signals for the multivibrator, which is accordingly shifted from one stable state to the other as the thyratrons fire. It will be noted that the thyratron anodes are provided with a positive potential only through the load resistors in the respective anode connections of the triodes 362 and 364. The purpose of this is to prevent repeated firing of either thyratron in the event that an initial firing signal is followed by a signal of the same polarity. For example, assume that the triode 362 is cut off and the triode 364 is conducting. Under this condition the thyratron 354 has a high positive potential applied to its anode so that it will be fired by a positive pulse at its control grid. When such a positive pulse occurs, a negative signal is emitted from the anode of thyratron 354 and is applied to the grid of triode 364 to effect cut off of this triode and the highly conducting state of triode 362. But when triode 362 conducts, the potential at the anode of thyratron 354 drops to a relatively low value with the result that a second positive pulse applied to its control grid will not effect its firing. On the other hand, the anode of thyratron 356 will then have a high positive potential due to the cut off of triode 364, so that it will fire upon the occurrence of the next positive pulse appearing at its control grid, this thyratron 356 having previously had its anode at low potential, due to the previous conducting condition of triode 364 so that it would not be fired by positive pulses at its control grid. Assurance is thus afforded that spurious pulses will not improperly fire the thyratrons which will be properly fired only by the origination of pulses of alternately opposite polarities at the terminal 330.

Output signals from the multivibrators are provided through the connection 378 from the anode of triode 364 to the grid of triode 380 in a cathode follower arrangement for the delivery of signals from the cathode through connection 382 to the terminal 384 which, in line with the foregoing, provides a square wave output.

As will more fully appear hereafter, a terminal 386 receives input pulses which are delivered to the grid of a cathode follower triode 385 which in turn provides corresponding signals from its cathode to the output terminal 392 when a switch 390 is in its upper (Record) position to cause its left-hand contact to engage terminal 388.

The terminal 392 is connected to a recording head to provide a signal trace which will discussed hereafter. This trace must under some conditions be erased, and for this purpose there is provided an oscillator 394 of conventional type which, when the switch 390 is in its lower (Erase) position is energized from the terminal 396 through connection 398. Through transformer coupling at 400 a relatively high frequency erase signal is delivered at such time through connection 402 to the terminal 392.

Summarizing the external connections of FIGURE 3, inertia switch pulse signals introduced at 330 give rise to signals operating the galvanometer 350. Alternatively, positive and negative pulse signals introduced at 330 give rise to rectangular pulses emitted from the circuit at terminal 384. Input signals at 386 provide corresponding output signals at 392, the latter terminal also providing, when desired, erase signals from the oscillator 394.

Figure 4:
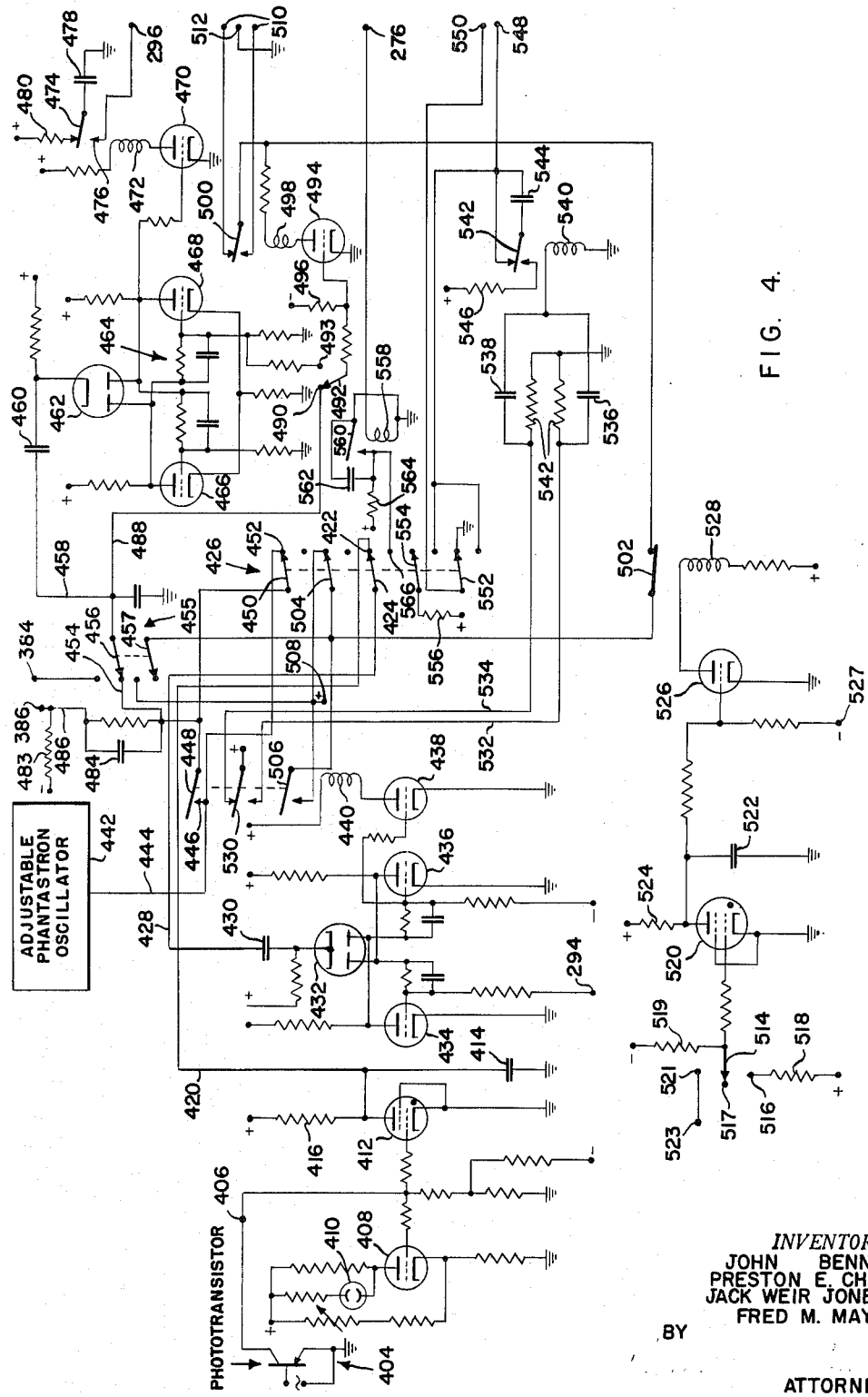

Reference to FIGURE 4 may now be made to complete the description of the major electronic assemblies. A phototransistor is provided at 404 and, as will appear, this reads openings in a circular chart recording movements of the drill stem carrying the logging apparatus as a function of time. The output of the phototransistor is provided through connection 406 which is joined to the grid of a triode 408 having a neon or similar indicating lamp connected across its plate load. The purpose of this is merely to provide an indication of the location of the openings in the circular chart. The connection 406 also runs to the control grid of a thyratron 412 having its anode connected through a high resistance 416 to a positive potential terminal and through capacitor 414 to ground. A transient discharge is produced when the normally charged capacitor 414 is discharged through the thyratron when the grid becomes positive due to illumination of the phototransistor. A negative pulse occurring upon firing of the thyratron at its anode is delivered through connection 420 and fixed contact 422 and movable contact 424 of a multiple blade switch 426 through connection 428 and capacitor 430 to the cathode of a dual diode 432 having its anodes connected to the cross-connected grids and anodes of triodes 434 and 436 in a bistable multivibrator circuit. Such connection occurs when the blade 424 and the other blades of switch 426 are in the upper positions indicated. The arrangement is such that the bistable multivibrator is thrown to its other stable state whenever discharge of the thyratron occurs, the states alternating. However, these transitions can occur only when the terminal 294 connected to the grid of triode 434 is negative due to the lower, operating positions of movable element 292 switch S'. The initial closure of this switch applies a negative pulse cutting off triode 434 so that initially the multivibrator always starts in this state.

The grid of triode 436 is connected to the grid of a triode 438 which controls current flow through the winding of relay 440.

An oscillator is provided at 442, and, while this may be of any desired type, since it is desirable that the frequency of its cycles should be accurately adjustable, it is preferably of the adjustable phantastron type comprising a pair of coupled phantastrons with voltage control of frequency and cathode follower output. Such an oscillator is highly stable as to frequency and may have its frequency accurately and readily adjusted merely by voltage control to particular values readable on a scale of a manually adjustable potentiometer. The output of the phantastron is delivered through connection 444 to the fixed contact 446 assoicated with a movable contact 448 of the relay 440. In parallel with the contacts just mentioned are the contacts 450 and 452 of the multiple blade switch 426, the last-mentioned contacts being engaged when the blades are in their upper position illustrated. As a result of this arrangement the phanastron output appears at connection 454, and when the blade 456 of switch 455 is in the lower position illustrated it is delivered through connection 458 and capacitor 460 to the cathode of the double diode 462, the anodes of which are connected to the cross-connections of the anodes and grids of a pair of triodes of a bistable multivibrator 464. For each negative pulse from the oscillator the multivibrator is changed from one state to another to act as a scaler. The anode of the triode 468 is connected to the grid of a triode 470 in the anode circuit of which there is the winding of relay 472 provided with the movable contact member 747. When this contact member is in its upper position the capacitor 478 receives a positive charge through the resistor 480, and when the contact member 474 moves downwardly upon energization of the relay the capacitor 478 is discharged through contact 476 to provide a pulse through terminal 296 which is that correspondingly designated in FIGURE 2.

The connection 454 is also joined to the terminal 386 of FIGURE 3 through a capacitor 484 which is shunted by a resistor. The terminal 386 is connected to a negative potential supply through a high resistance 483. The switch contact 456 is also connected at 488 to a fixed contact 490 of a switch having its movable contact 492 connected to the grid of triode 494, the grid being returned through a resistor 496 to a negative supply terminal. In its alternative position, the movable switch contact 492 is engageable with a contact 493 connected through a resistor to the grid of the triode 468 of the multivibrator 464. In the anode circuit of the triode 494 there is the winding of a relay 498 provided with a movable contact 500 operating between fixed contacts respectively connected to output terminals 510 connected to the winding of an escapement motor, which windings have their ground return indicated at 512. This escapement motor may be of the type described in Patent No. 2,668,012, the motor being arranged to advance the record chart of the playback apparatus. By utilizing the alternative positions of the switch 492 the escapement motor may have, selectively, a step for each pulse appearing at 456 or a step for every two such pulses. The movable contact 500 is connected to the positive supply terminal 508 through the relay contacts at 502, when these are closed, and through selective arrangements of the movable contact 506 of the relay 440 and the movable contact 504 of the switch 426. The positive supply connection is provided when the relay 440 is energized or when the switch blade 504 is in its upper position, or when both such conditions exist.

The input terminal 384 (FIG. 3) may provide an input to the switch 456, when this switch is in its upper position, in place of that provided by the phantastron.

The escapement motor is subject to overriding control by the opening or closing of the relay contacts at 502. When the winding 528 is deenergized, these contacts are closed. They are opened by energization of this winding which is subject to control as follows:

A switch 514 has three contact positions at 516, 517 and 521. When the switch 514 engages the middle open contact 517, the control grid of a thyratron 520 is connected through a resistance 519 to a negative potential terminal so that it cannot pulse although its mode is connected through a high resistance 524 and to a capacitor 522 which would form a pulsing circuit if the thyratron was permitted to fire. When not firing, the anode potential is sufficiently positive to drive the grid of triode 526 positive despite its biasing connection to the negative terminal 527. Triode 526 thus conducts and winding 528 is energized opening the contacts at 502. This position of switch 514 is a standby position preventing operation of the escapement motor.

If the switch 514 engages contact 516, its connection through resistor 518 to a positive supply terminal raises the thyratron control grid potential to a firing valve causing pulsing of the thyratron. The average potential of the ungrounded terminal of capacitor 522 is then so low that the triode 526 is cut off by its grid biasing potential, and relay 528 is deenergized, closing contacts 502.

The third position switch 514 engaging contact 521 provides for the introduction of any desired voltage pattern at terminal 523 for automatic control purposes involving sequential periods of firing or non-firing of the thyratron. The relatively elaborate control system is for this last possibility since the desired input at 523 may provide very little power, quite inadequate to operate relay 528 directly.

Another movable contact 530 of the relay 440 is connected to a positive supply terminal and is arranged to operate between fixed contacts which are connected through lines 532 and 534 and through capacitors 536 and 538 to the winding of a relay 540. Resistors 542 connect the lines 532 and 534 to ground to provide discharge of the capacitors 536 and 538 after charging occurs. The relay winding 540 is energized, as will be evident, each time the relay 440 is energized or deenergized. The movable contact 542 of the relay 540 operates between two contacts, one of which is connected through the resistor 546 to a positive supply terminal, while the other is connected to a galvanometer terminal 548 which is also connected to the movable contact 542 through capacitor 544.

The terminal 548 is connected to the same galvanometer element as is connected to terminal 212 of FIGURE 2, but deflects this element in the opposite direction to give markings for depth correlation in the initial playback of the tape.

A second galvanometer terminal 550 is connected to the movable blade 552 of the switch 426. In its upper position this blade makes contact with a grounded terminal. In its lower position it engages a contact which is connected to the terminal 548. Another blade 554 of switch 426 is connected through resistor 556 to a positive supply terminal. When this blade 554 is in its lower position it engages a contact connected with the terminal 548. The arrangement provides galvanometer records as will be later described.

The winding of a relay 558 is connected between ground and the terminal 276 which has previously been described in FIGURE 2. The movable contact of this relay which is indicated at 560 is arranged to engage, upon energization of the relay, a fixed contact to short circuit a capacitor 562. The movable contact 560 is grounded. Charging of capacitor 562 is provided through a resistor 564 connected to a contact 566 engageable by the switch blade 424 of switch 526 when this blade is in its lower position.

The operations of the described elements of FIGURE 4 may be summarized as follows:

Assume that the contacts at 502 are closed due to deenergization of relay 528. Assuming, first, an upper position of the movable contacts of switch 426 and a lower position of the movable contacts of switch 455, the following results occur regardless of the condition of the phototransistors 404:

Through the closed contact 450, 452, pulses from the oscillator 442 are delivered through contact 456 to the multivibrator 464 which produces a division by two. This signal is then used to actuate relay 472. Capacitor 478 is normally charged through resistor 480 while contact 474 is in the deenergized position. Each time the relay is energized capacitor 478 is discharged into the stepping switch coil 298. The operation of this circuit will be explained later.

The signal from multivibrator 464 is also available at contact 493 of switch 492. If the switch 492 is in its left-hand position, the phantastron pulses effect intermittent operations of the relay 498 to provide pulses through terminals 510 to the escapement motor because due to the closed condition of contact 504 the movable contact 500 is connected to a positive supply source. If the switch 492 is in its right-hand position, the same action occurs except that the phantastron pulses delivered to relay 498 are scaled down by a factor of two.

If pulses are at this time being delivered from the phototransistor 404, each pulse changes the state of the multivibrator comprising the triodes 434 and 436 and consequently the relay 440 is energized during periods following the alternate pulses producing a conductive condition of triodes 436 and 438. This relay, however, has no effect on those operations due to the phantastron pulses, but through its movable contact 530 will provide an output at terminal 548 to the galvanometer element in the form of one pulse for each pulse originating at the thyratron 412. Note that a pulse appears at 548 when the relay is energized or deenergized.

In contrast with the foregoing, if the switch 426 has its contacts in their lower positions, the control of the routing of the pulses from the oscillator 442 is dependent on the energization or deenergization of the relay 440. Under these circumstances, the multivibrator 434, 436 is under the control of pulses entering at 276 rather than from the phototransistor 404. It will be recalled that the signals entering at 276 are those emitted upon the attainment of predetermined counts in the assembly illustrated in FIGURE 2. Each time the relay 558 is energized by one of these pulses, a negative pulse is emitted through the now engaged contacts 424 and 566 to pass to the diodes 432. Each pulse provides a transition of the relay 440 between its energized and deenergized conditions. Whenever the relay is energized, its contacts 448 and 506, respectively, effect the same circuit connections as resulted from the upper positions of the contacts 450 and 504 of the switch 426. Thus, during these energized periods of the relay 440 the phantastron oscillator pulses are delivered as previously described to multivibrator 464 and to contact 492.

On the other hand, when the relay 440 is deenergized, the phantastron oscillator pulses are cut off from both the terminal 296 and the terminals 510. Corresponding to the transitions of the relay 440, galvanometer outputs are provided at the terminals 548 and 550.

If the switch 456 is in its upper position, pulses from the oscillator 442 are cut off, but pulses entering at terminal 384 may then be used to provide outputs at terminal 510. Under these conditions positive potential is applied to contact 500 through closure of switch 457. (In the use of the apparatus when switch 456 is up there are no inputs at either 404 or 276.)

Figure 6:
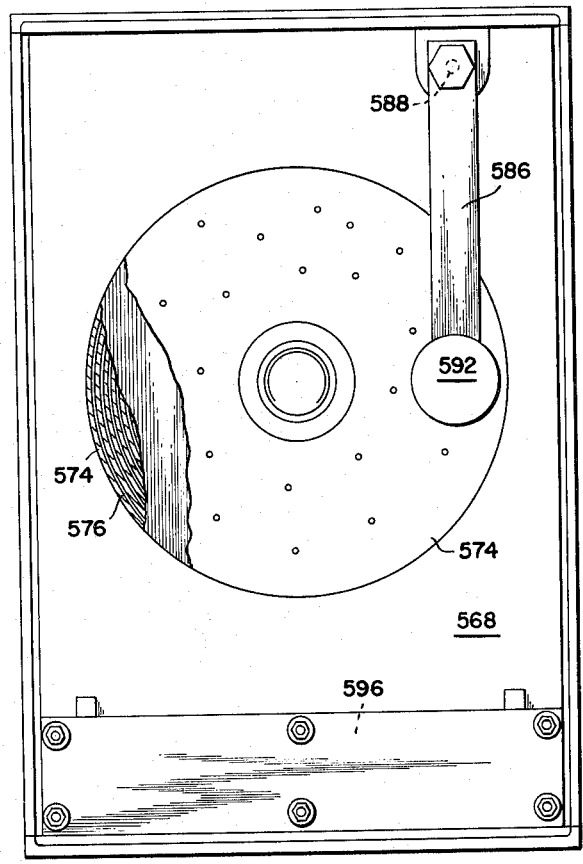
FIGURE 6 is an elevation looking at the left-hand side of FIGURE 5, the elevation being partly in section.
Figure 5:
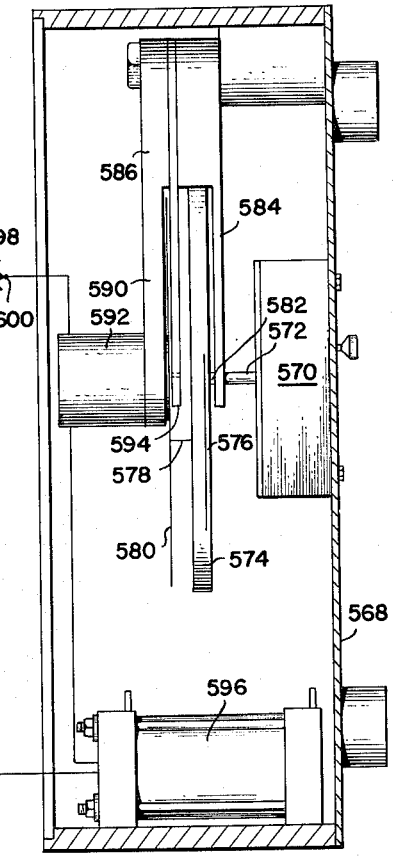
FIGURE 5 is a side elevation of an auxiliary piece of apparatus used at the derrick during a logging operation to make a record of times at which movements of the drill stem are started and stopped.

Description of the reproducing apparatus will now be interrupted for background reference to the apparatus illustrated in FIGURES 5 and 6 which is used on the drilling rig to provide a surface record during the logging operation. This apparatus is convenient, though not necessary, to provide a time record of the beginnings and terminations of active logging periods. As has been indicated, logging is in a preferred form effected by raising (or lowering) the logging apparatus by a supporting drill stem. The logging operation consists of periods during which the drill stem is being moved lengthwise of the hole interspersed with periods when this lengthwise movement is interrupted for the removal or replacement of drill stem sections. Typically, for example, there may alternate rises of ninety feet occurring during active logging periods, with interruptions of more or less duration during which the portions of the drill stem within the hole are not moved vertically, but remain stationary during removal or replacement of sections at the surface. A log may be kept of the actual extents of the logging movements, and this alone may suffice. But to secure good checks on proper operations, and since the tape in the logging apparatus is continuously moving, it is convenient to record against a time scale the instants at which lengthwise movement of the drill stem is interrupted and resumed. The apparatus now about to be described is provided at the derrick.

The apparatus comprises a frame 568 which supports a clock motor 570 which may be mechanically or electrically driven at an approximately uniform rate. There is no special need to correlate this rate with the expected rate of advance of the tape within the logging apparatus, though an approximate correlation is desirable to minimize the range of ultimate adjustments which are required. The clock motor, through its shaft 572, drives a disc 574 provided with a spiral groove 576 and also with a mounting 578 for a paper record disc 580. A pin 582 extending from an arm 584 extends into the groove 576. The arm 584 forms part of a lever 586 pivoted to the frame at 588. Another arm of this lever indicated at 590 carries a solenoid operated punch 592 which cooperates with a die opening in another arm 594 of the lever. When the solenoid is energized, a hole is punched into the disc 580. As will be evident, during operation, the successive holes lie along a spiral path. The solenoid of the punch assembly 592 is energized by a battery 596 in series connection with a switch 598 and a fixed contact 600, the switch 598 being normally disengaged from the contact 600 but wiping past it to make momentary contact whenever the weight of the drill stem is imposed upon or released from the rotary table of the derrick. Since this removal or restoration of weight produces substantial deflections in the supporting means for the drill stem, the switch arm 598 is merely mechanically connected to a convenient part of this supporting assembly which is subject to deflection. When the drill stem is held by the usual slips, the switch arm 598 may be below the contact 600, and when the drill stem is released from the slips it will be above the same, so that each transition of the supporting conditions will be represented by a hole in the disc 580, the time of occurrence of the transition being thus related to the position of the hole in the spiral path on the disc.

This paper record is then read as follows by the apparatus illustrated in FIGURES 7 and 8 which forms part of the reproducing apparatus.

The reading apparatus comprises a frame 602 in which is mounted for vertical adjustment a plate 604 provided with a threaded block 606 receiving a screw 608 journaled in the frame and provided with a graduated adjustable knob 610, the plate 604 being pulled downwardly by springs 612 anchored at their lower ends to the frame. The frame carries on a shaft 614 a disc 616 which mounts at 618 the paper disc 580 produced in the apparatus of FIGURES 5 and 6. Arms 620 and 622 of a lever 624 which is pivoted to the plate 604 at 626 carry, respectively, a lamp 628 and the phototransistor 404, previously described, these being aligned with openings 630 traversed by the holes in the disc. The disc 616 is provided with a spiral groove identical with that of the disc 574, this groove being entered by a pin 627 carried by the lever 624.

Variable speed drive of the disc 580 is effected by an electric clock motor 632 through its shaft 634 which carries a disc 636 provided with a friction surface engaging the back of the disc 616 to effect its rotary drive. The speed at which the disc 616 is rotated is determined by the radius of the contact between the drive disc 636 and disc 616, and this speed is measureable by the setting of the graduated knob 610 which, by adjustment, determines the radius by virtue of upward or downward movement of the plate 604 with respect to the position of the driving disc 636.

Figure 8:
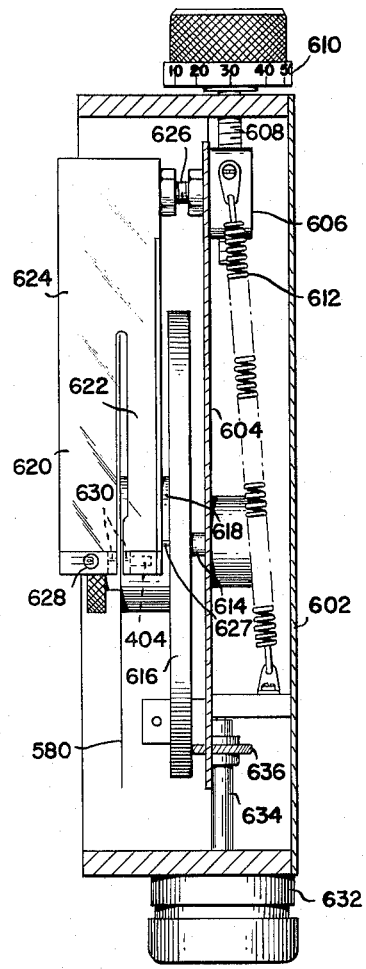
FIGURE 8 is a vertical section taken on the plane indicated at 8—8 in FIGURE 7.
Figure 7:
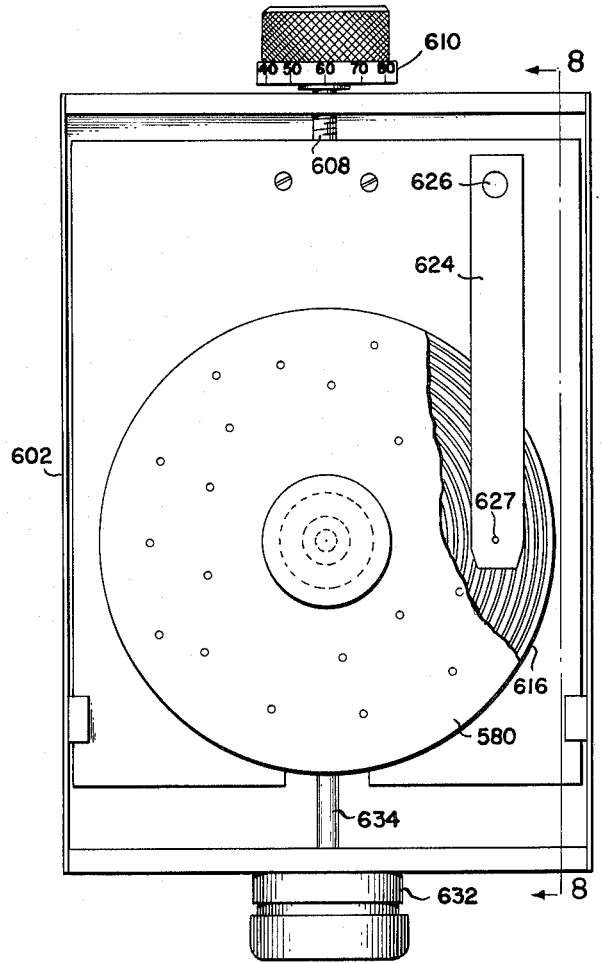
FIGURE 7 is an elevation of an apparatus element for reading the record made by the apparatus of FIGURES 5 and 6.

Referring back to the description of FIGURE 4, it will be evident that the use of the apparatus shown in FIGURES 7 and 8 to pick up light pulses from the disc made in the apparatus of FIGURES 5 and 6 will provide electrical pulses through the use of the phototransistor 404 which in the reproducing apparatus will be to an adjustable time scale, corresponding, roughly, to that of the time scale of the operations at the derrick floor. As will appear hereafter, there is no attempt made to provide any exact time correlations, but the apparatus just described aids in checking events which are reproduced, the use of the apparatus being consistent with the assumptions already indicated that the rate of movement of the drill stem during any logging interval is approximately constant during that interval, and that the rate of magnetic tape movement in the logging apparatus is substantially uniform throughout a period of time encompassing at least two periods of logging movement, though without the existence of any exact knowledge of the actual rates of movement of either the drill stem or the magnetic tape.

Reference may now be made to FIGURE 9 which shows in block diagram the interconnections of the various units of the apparatus and also other elements which have not been so far described. Those elements previously described are identified with the figures in which they are detailed and contain legends which identify them operationally. In various of these, furthermore, there are indicated the manual controls which are involved in operation of the apparatus, for example, the count presetting dials of the stepping switch assembly of FIGURE 2, and various switches which are illustrated as movable to up or down positions or to right and left positions consistently with the detailed disclosure. Input and output terminals by which the various units are interconnected have been, in the various figures, identified by the same numerals, and these are correspondingly designated in FIGURE 9. Accordingly, it is unnecessary to elaborate on these connections except with reference to elements not described in detail.

A tape playback and recording apparatus is indicated at 650, and since this may be entirely conventional, it need not be described in detail. This apparatus, as used herein, is provided with eight recording and reproducing channels which are designated by numerals at 652, these designations of the channels corresponding to those illustrated in the record tape shown in FIGURE 10. The same heads are used for both recording and for reproduction in this apparatus, and the same heads may be furthermore, used for erasure of records. As will appear, the original information contained on the tape and produced during the logging is retained thereon in four of the channels, but additional information is recorded and possibly erased and rerecorded as will hereafter appear, this being in an originally vacant channel.

The tape is advanced during the playback operations by a constant speed motor drive indicated at 654. As already indicated the rate of tape drive during the logging is unknown, and the variations of speed are also unknown. However, in a satisfactorily operating apparatus, the approximate rate of tape advance will be known, and will, furthermore, be at least approxiamtely constant, so that a constant speed drive in the reproducing apparatus, whatever it may be, will have an approximately constant ratio in the drive of any portion of the tape to the speed of advance which occurs during the logging operation. While there is no particular advantage in having the tape fed in the reproducing apparatus at approximately the same rate as that which occurred during the logging, it will be assumed for simplicity of description that this is the case, merely to avoid elaboration of the description by repeated references to speed ratios.

The reader for the perforated chart described with reference to FIGURES 7 and 8 is driven, as described, at adjustable speed, the adjustment being effected through the graduated screw 610. It was assumed that in the making of this chart the chart was driven at a constant speed. By initially driving the chart at approximately the same speed as that at which it was formed by the punching mechanism, there may be expected that there will be some approximate correspondence between the records made in the playback apparatus so as to facilitate readjustments as are involved to secure accuracy without precise controls of speeds or constancy of speeds.

The escapement motor heretofore referred to as driven by the output at terminals 510 is indicated at 658. This motor produces, for each long normal pulse, a small advancing step of the recording paper in the visual chart producing apparatus indicated at 660. This apparatus may be completely conventional, consisting of an arrangement of a plurality of recording galvanometers providing side-by-side curves of corresponding variations of variables. Such multiple recording galvanometers are usually driven by constant speed motors; but in the present case the use of the escapement motor leads to correlations as will appear later, and ultimate reproductions of the logs to a linear depth scale. While various types of recorders may be here used, it will be assumed for simplicity of description that the chart comprises photographic paper exposed to moving spots of light deflected in accordance with the input to the galvanometers incorporated in the apparatus.

Before proceeding to a description of the operation of the complete apparatus as illustrated in FIGURE 9, with reference to the preceding figures, it may be further remarked that obvious switching connections and disabling switches, etc., have not in all cases been described. Such switching, however, may obviously be effected by a simple switching panel. Furthermore, selections are in several instances effected by plugging different record heads into the circuits.

The magnetic record produced in the logging apparatus has already been described with reference to FIGURE 10. This is first played back in the unit 650 to produce the visual chart in the apparatus 660 typified, in part, in FIGURE 11, which particularly indicates the initial portion of such chart C.

Figure 11:
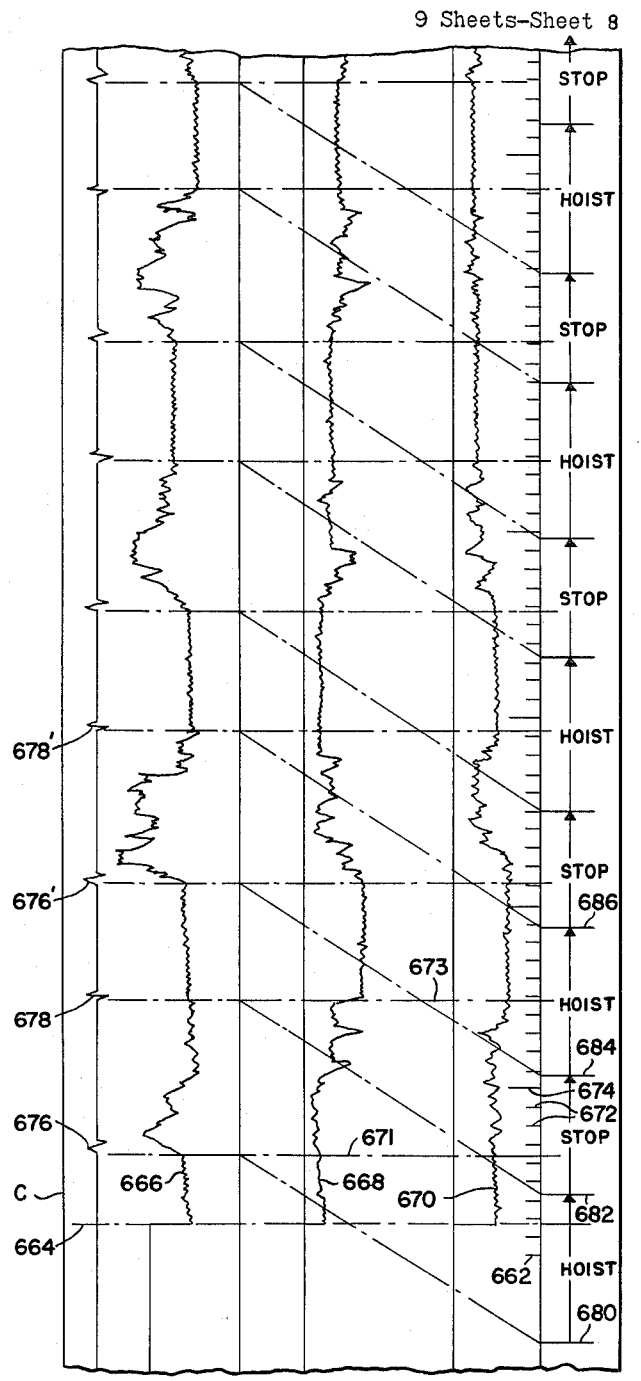
FIGURE 11 is an illustration of a portion of the first visual record which is made in the analysis of the logging results, this figure containing diagrammatic indications of matters of interest.

The sequence of operation in starting the logging may be varied, and accordingly the beginning of the chart illustrated in FIGURE 11 is only one possibility of what may occur as will now be described. Consistent with what is shown, it may be assumed that during the original recording the cycles of the potentiometers were started before the apparatus was put in condition to make the several logs, so that markings of the potentiometer cycles start at 662 prior to the beginning of the log as illustrated at 664. The logging apparatus, however, is considered to have been conditioned to respond to the electrical logging signals before hoisting of the apparatus occurs, as indicated by the first inertia switch impulse at 676 or the beginnings of the first significant deviations of the logs.

The self-potential, short normal and long normal logs are respectively indicated at 666, 668 and 670, being derived from the channels 3, 5, and 7 through the respective amplifiers which, as has been stated, correspond to the amplifier part of FIGURE 1. These logs start at 664, and their first portions are illustrated as involving merely electrical "noise" during the original stationary condition of the drill stem. At 671 there is indicated the beginning of the first hoisting operation. The respective logs have been shown in a somewhat typical condition, in which one of the logs, here the self-potential log, shows immediate and well-recognizable changes occurring at the start of the hoisting operation, whereas the other two logs 668 and 670 show relatively little change at the initial part of the hoisting operation. Considering the three logs, at least one of them thus shows the beginning of hoisting; but this is also clearly indicated by the pulse 676 corresponding to that produced by the inertia switch in the logging apparatus. As already indicated, the inertia switch and its record may be omitted, but in the present description it will be assumed that inertia switch pulses are produced which will at least serve to confirm the initiation and termination of hoisting intervals. Simultaneously with the tracing of the logging curves, there are produced the markings 672 and 674 which count the tens and hundreds of potentiometer cycles. Reference to the markings at 672 will show that the hoisting operation occurred at a cycle count of 63. The portions of the logs above the marking line 671 indicate the signals produced during the first hoisting operation which terminated at 673 at the count of 148 potentiometer cycles. It will be noted that the stopping of the hoisting operation is clearly and typically indicated in the cessation of variations, above the noise level, in the self-potential and short normal logs. It is, of course, confirmed by the inertia switch marking at 678. The logging operation continues with indications of the starting and stopping of hoisting operations by the beginnings and endings of substantial variations of the logs and also by the inertia switch pulses as indicated at 676' and 678'. By drawing lines on the original record transversely thereof, these starts and stops of the hoisting operation may be related to the counts of potentiometer cycles.

In the original recording there is made still another record which appears on the chart C as the right-hand deviations 682, 684, 686, etc., produced by deflections of the same galvanometer as that which produced the markings 672 and 674, but in the opposite direction from the base line of the record of this galvanometer. These markings are produced from the perforated chart reader of FIGURES 7 and 8.

Following this preview of the first chart produced in the playback apparatus, there will now be described the operations involved. The tape is driven, during this and other reproductions, at constant speed by the drive motor arrangement 654. The reproductions of the inertia switch signals and of the self-potential, short normal and long normal logs are straightforward, the inertia switch signals being amplified from the input terminal 330 to the recording galvanometer element 350 of FIGURE 3, while the amplifier and conversion arrangement for the logged signal are those previously involving the portions of FIGURE 1 external to the assembly A. The assembly A operates, of course, to provide the sawtooth wave. The chart C is driven by phantastron pulses as follows:

Taking into consideration the approximately known speed of the tape and the approximately known rate of hoisting of the drill stem during logging intervals, the phantastron frequency is so adjusted that it would produce steps of chart advance each of which would correspond to a definite displacement of the logging apparatus, for example one foot of logging progress. The adjustable speed drive of the circular chart is also set so that markings should appear corresponding to the beginnings and terminations of hoisting periods spaced along the chart driven as stated by distances corresponding to the extent of each hoisting distance. It should be noted that this first playback is merely to get a first approximation to a plot against a linear depth scale which approximation may be expected to be reasonably close to a correct plot to facilitate later corrections.

In this operation the switch 456 is in its lower position, switch 493 may be assumed to be in its left-hand position, and switch 426 is in its upper position. The output at 296 is not used.

During this playback the pulses emitted at 85 of FIGURE 1 produce stepping of the stepping switch assembly of FIGURE 2. The presetting contacts are not used, and their effects may be eliminated in various ways, by cutting off the power to the portion of the circuitry which controls the relays 214 and 216, by cutting off the output at 276, or otherwise. The counting is, of course, effected after homing of the stepping relays. The galvanometer element at 212 then provides the markings indicated at 672 corresponding to counts of ten and hundred pulse groups.

At the same time, the phototransistor 404 reads the holes in the record disc and provides an output to the galvanometer connection 548 to provide pulses extending to the right and indicated at 680, 682, etc., on the passage of each hole by the phototransistor. The result of the foregoing is the production of the chart of FIGURE 11.

It may be noted that the pulses originating in the perforated circular chart will, in general, be displaced lengthwise of the chart C to an unknown extent relative to the inertia pulses and the changes in the log traces representing the stopping and starting of the hoisting interval.

In view of this, the right-hand portion of the chart containing the markings of the starting and stopping of the hoist may be cut off to provide a strip which the operator may slide along the chart. Let it be supposed, first, that inertia switch pulses were not recorded on a chart C. It would be practically certain that for most of the starts and stops of the hoisting their occurrances would be clear from at least one of the logs. Thus it is possible to slide the cut off strip containing the markings 680, 682, etc., into transverse alignment with the corresponding characteristic deviations of the logs, starting with the first part of the record and marking transverse lines across the chart to provide indications of the hoisting starts and stops. These lines would be such as indicated at 671 and 673. If, in some instances, none of the logs had such character as to permit identification of starts and stops, then interpolations may be made assuming a uniform drive of the tape over the limited period of a few hoisting intervals, and also assuming uniform rate of rise during at least several raising periods. The result is that the entire chart C may have such markings 671, 673, etc., drawn across it.

It should be noted that it may be necessary to readjust the cut off strip along the chart for interpolation purposes, using well-identifiable starts and stops of the logs for alignment, since there is no assurance of correspondence of the time scales over extended distances along the chart. Interpolation must, therefore, be made only locally.

It may be here noted also that instead of using a recorded scale of the hoisting and stopping period, the equivalent might well be drawn by hand from data kept at the surface during the logging, which data would be a record of the starting and stopping of hoisting in terms of time and extents of the hoisting.

From the foregoing, it will be evident that the desired results could be secured without utilizing the inertia switch markings; but they are desirable as an aid in the identification of the starting and stopping of the hoisting. Even if there was some maloperation in producing these inertia markings, however, such maloperation would be detectable. With an inertia switch arrangement it is possible that some spurious pulses might have been recorded due to some sudden vibration or relief of tension or the like. The scale at the right of the chart will, however, enable these spurious pulses to be disregarded.

What the foregoing leads to is the possibility of making a tabulation of the starting and stopping lines against counts of the pulses 672, with identification of each of the lines such as 671 and 673 with depth utilizing records made at the surface. Usually in practice the same lengths of drill stem will be removed during all of the stop periods, but this is not necessarily true.

After the tabulation of pulse count as just stated, it is no longer necessary to use either the inertia pulse record nor the information secured from the perforated disc.

Before proceeding with the next step another set of corrections may be noted as follows:

The assumption was made that each advance of the chart by a phantastron pulse corresponded to some depth increment such as one foot. The advance of the chart per phantastron pulse is known from the characteristic of the chart drive, and now also marked are actual depth displacements between the transverse markings on the chart. Accordingly, measurements may be made to determine how many phantastron pulses actually occurred in moving the chart between a pair of lines bounding a hoisting distance. Suppose, for example, it is found that for a hoisting distance of ninety feet, taking an average for several such hoistings, there were 88.6 steps produced by phantastron pulses imparted to the chart, each supposed to correspond to one foot. Such measurements would indicate the required correction of the phantastron frequency to secure, in the part of the chart thus measured, ninety steps per ninety feet. Such corrections may be tabulated for various parts of the chart since the correction may not be uniform due to variations of the speed of the tape during logging, noting that the deviations here involved are actually due to the fact that the advance of the tape per unit time during the logging is not known.

A second playback of the tape is now made. The tape is again advanced at the same constant speed as before, but the chart is advanced only during periods of playback corresponding to hoisting, with elimination of the records made during stops of the hoisting of the logging apparatus. At the same time control markings are put on the tape to make possible the future production of duplicate charts from the tape.

To accomplish the foregoing, the recording connections for the self-potential, short normal and long normal traces are made as before, but the head reading the inertia switch pulses is disconnected from the input terminal 330 of FIGURE 3. Terminal 386 is now used to introduce rectangular pulses from the output of the phantastron oscillator 442 (though subject to control, as will appear) to the cathode follower 385, whence they are delivered at 392 for recording on channel 2 of the reproducing and recording apparatus 650.

Switch 456 remains in its lower position. Switch 426 is now moved to its lower position.

The stepping switches in FIGURE 2 are homed. Operation is started by moving downwardly the switch $S_1$ which effects deenergization of relay 440 by flipping the multivibrator 434, 436 to the corresponding state if it is not already therein.

Noting that, as indicated at the right of FIGURE 11, the potentiometer counts start during a stop period of the hoisting operation, there will have been set at the switches 150, 150' and 150" a count corresponding to the count of pulses 672 at the beginning of the first hoisting interval.

As the tape advances, the chart remains stationary prior to the attainment of this preset count. Due to the fact that relay 440 is deenergized phantastron pulses are not delivered either to terminal 386 nor the connection 454 so that no stepping pulses are delivered to the escapement motor at 510 and no pulses are delivered at terminal 296.

In the meantime, the count presetting switches 152, 152' and 152" are set to the count corresponding to the end of the first hoisting period.

When the count preset in the switches 150, 150' and 150" is reached, the transition of states of relays 214 and 216 occurs as described above, and a pulse is issued at 276 (FIGURE 2) energizing relay 558 to provide a negative pulse to the multivibrator 434, 436 changing it to its other state with the result of energization of relay 440.

Through contacts 446 and 448 phantastron pulses are now delivered at 386 and 454. The former provides rectangular pulses to the cathode follower 385, whence they are delivered through terminal 392 to the recorder channel 2. From the latter connection stepping pulses are provided to advance the chart, and pulses are also emitted at 296, at half the rate of the phantastron pulses, to the stepping switch 300 which provides at 322 output pulses to the corresponding galvanometer element to mark ten foot depth intervals. (It may be here noted that to get ten foot markers to correspond to ten foot multiples of depth as measured from the surface, the stepping switch 300 is preset to a proper count to correspond to the depth of the start of logging.)

At this time there may also be made markings of the rest position of the logging apparatus through galvanometers connected to terminals 548 and 550 which conjointly operate to provide a marking across the chart.

The operation just described proceeds until the preset count is reached which determines the end of the first hoisting interval. When this occurs another output is provided at 276 which changes the state of the multivibrator 434, 436 to that controlling the blanking out of phantastron pulses to prevent stepping, the production of markings in channel 2 of the tape, and the production of pulses stepping the switch 300 which then retains its count. In the meanwhile, there is again a presetting of the step count for the resumption of operation by the phantastron pulses. The foregoing conditions are repeated for the complete reproduction of the tape records.

The results of the foregoing are indicated in FIGURES 12 and 13.

The tape now has added in channel 2 the pulses D which originated at the phantastron. The transverse line E represents the transition point from a stationary condition of the logging apparatus to a hoisting condition, and corresponds closely to the occurence of the inertia switch pulse I. The pulses D were not recorded prior to E but are recorded thereafter until there again is reached a point on the tape corresponding to the cessation of hoisting.

The chart C' has been shown as containing the same logging record as that in FIGURE 11, but now, due to the operations which have been described the chart shows only the logging traces produced during periods of hoisting. The ten foot markings are indicated at 690, while the start-stop markings (now the same) are shown at 692.

The chart in FIGURE 13 is shown as containing an error which might well occur, and which requires correction. Assuming that the hoisting intervals between the lines 692 were known to be ninety foot intervals, it will be noted that the ten foot markings do not correspond. What this means is that despite an original attempt to adjust the phantastron frequency, it was not precisely adjusted. Measurement of the error will now indicate the corrections necessary to the phantastron frequency (which corrections may vary along a lengthy chart), and corrections may now be made by first erasing the pulse record in channel 2 of the tape and repeating the operations which were described for the production of the results of FIGURES 12 and 13, but with the phantastron frequency corrected.

The corrected chart is illustrated at C" in FIGURE 14, in which the markings corresponding to 690 and 692 are designated, respectively, as 690' and 692'. If the chart is now satisfactory, the tape will contain pulses in channel 2 which are correctly located. Since the tape in its final condition would not be substantially different from what is indicated in FIGURE 12, it is not separately shown.

The tape may now be reproduced as often as desired to give log charts which contain the logging traces to a linear depth scale. Such reproduction is effected as follows:

Switch 456 and its associated switch 457 are moved to their upper positions, and switch 426 is moved to its lower position. The irrelevant portions of the apparatus may be rendered inoperative, these including the phantastron oscillator, the relay 440 and its control devices, the stepping switches (with the exception of stepping switch 300) etc. Terminal 330 is connected to the reproducing head of channel 2 of the tape. It delivers pulses of rectangular form at 384. The purpose of the rather elaborate circuitry in FIGURE 3 will now be apparent. The head would produce only sharp pulses at the beginning and termination of each of the recorded pulses D, whereas a rectangular wave form initiated at the beginning of each of these pulses is required for the operation heretofore effected by the phantastron oscillator. The rectangular pulses at 384 enter the assembly in FIGURE 4, and, as will be evident, they provide stepping pulses for the escapement motor at 510 and effect the delivery at 296 of pulses which operate the stepping relay 300 to provide chart markings indicative of each ten foot depth interval. The outputs at 548 and 550 are now eliminated with the result that the final log chart is the same as that illustrated in FIGURE 14 with the exception that the markings 692' are eliminated.

In these final reproductions from the tape the scale may be changed by shifting the switch 492 as will be obvious. This switch may also be utilized to change scaling during the preceding operations.

It will be evident from the foregoing that the apparatus described has major utility when, as is most convenient, the recording apparatus is completely free of surface control and does not involve the elaborations necessary in providing complex control devices, especially timing devices, in the logging apparatus. Ultimate accurate results are secured so long as there is justification for the non-stingent assumptions which have been heretofore discussed. The apparatus may, of course, be used even when the problems to be solved are considerably simpler. An example would be the operation of self-contained logging apparatus on a wire line where there might be eliminated the aspect of starting and stopping repeatedly as is necessary in the case of drill stem logging when extended depth ranges are to be logged.

It will be evident that numerous changes may be made in the details of the apparatus and that simplifications may be provided when the problems presented are less exacting, all of such changes being possible without departure from the scope of the invention as defined in the following claims.

What is claimed is:

1. In combination with a record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual log of signals picked up by said pickup means, means providing on said chart markings corresponding to linear intervals along said record member, and means for providing on said record member, subsequent to the production of said log record thereon and in addition to said log record, depth correlating markings.

2. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means providing on said chart markings corresponding to linear intervals along said record member, and means for providing on said record member, subsequent to the production of said log record thereon and in addition to said log record, depth correlating markings.

3. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means providing on said chart pulse record markings corresponding to linear intervals along said record member, and means for providing on said record member, subsequent to the production of said log record thereon and in addition to said log record, depth correlating markings.

4. In combination with a record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual log of signals picked up by said pickup means, means providing on said chart a record of depth versus time, means providing on said chart markings corresponding to linear intervals along said record member, and means for providing on said record member, subsequent to the production of said log record thereon and in addition to said log record, depth correlating markings.

5. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means providing on said chart a record of depth versus time, means providing on said chart markings corresponding to linear intervals along said record member, and means for providing on said record member, subsequent to the production of said log record thereon and in addition to said log record, depth correlating markings.

6. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means providing on said chart a record of depth versus time, means providing on said chart pulse record marking corresponding to linear intervals along said record member, and means for providing on said record member, subsequent to the production of said log record thereon and in addition to said log record, depth correlating markings.

7. In combination with a record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a first chart, means for producing on said first chart a visual log of signals picked up by said pickup means, means providing on said first chart markings corresponding to linear intervals along said record member, means for providing on said record member, subsequent to the production of said log record thereon and in addition to said log record, depth correlating markings, a second chart, and means controlled by said depth correlating markings for effecting advance of said second chart while providing thereon such visual log of signals picked up by said pickup means.

8. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a first chart, means for producing on a first chart a visual variable amplitude log of the pulse signals picked up by said pickup means, means providing on said first chart markings corresponding to linear intervals along said record member, means for providing on said record member, subsequent to the production of said log record thereon and in addition to said log record, depth correlating markings, a second chart, and means controlled by said depth correlating markings for effecting advance of said second chart while providing thereon such visual log of signals picked up by said pickup means.

9. In combination with a pulse record member made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a first chart, means for producing on said first chart a visual variable amplitude log of the pulse signals picked up by said pickup means, means providing on said first chart pulse record markings corresponding to linear intervals along said record member, means for providing on said record member, subsequent to the production of said log record thereon and in addition to said log record, depth correlating markings, a second chart, and means controlled by said depth correlating markings for effecting advance of said second chart while providing thereon such visual log of signals picked up by said pickup means.

10. In combination with a record member made in a bore hole and advanced during recording in the bore hole relatively to a recording means at a rate uncorrelated with depth, which record also contains records of starts and stops of movement of the logging means, apparatus for the production of a bore hole log substantially linear with depth from said record member comprising pickup means for picking up logged signals from at least one log record on said record member, means providing relative linear movement between said record member and said pickup means, a chart, means for producing on said chart a visual log of signals picked up by said pickup means, means for reproducing on said chart said records of starts and stops of movement of the logging means, means providing on said chart markings corresponding to linear intervals along said record member, and means for providing on said record member, subsequent to the production of said log record thereon and in addition to said log record, depth correlating markings.

11. In combination with a pulse record member made in a bore hole and advanced during recording in the bore hole relatively to a recording means at a rate uncorrelated with depth, which record also contains records of starts and stops of movement of the logging means, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means for reproducing on said chart said records of starts and stops of movement of the logging means, means providing on said chart markings corresponding to linear intervals along said record member, and means for providing on said record member, subsequent to the production of said log record thereon and in addition to said log record, depth correlating markings.

12. In combination with a pulse record member made in a bore hole and advanced during recording in the bore hole relatively to a recording means at a rate uncorrelated with depth, which record also contains records of starts and stops of movement of the logging means, apparatus for the production of a bore hole log substantially linear with depth from said record member comprising pickup means for picking up logged signals from at least one log record on said record member, means providing relative linear movement between said record member and said pickup means, a chart, means for producing on said chart a visual variable amplitude log of the pulse signals picked up by said pickup means, means for reproducing on said chart said records of starts and stops of movement of the logging means, means providing on said chart pulse record markings corresponding to linear intervals along said record member, and means for providing on said record member, subsequent to the production of said log record thereon and in addition to said log record, depth correlating markings.

13. In combination with a record member made in a bore hole and advanced during recording in the bore hole relatively to a recording means at a rate uncorrelated with depth, which record also contains records of starts and stops of movement of the logging means, apparatus for the production of a bore hole log substantially linear with depth from said record member comprising pickup means for picking up logged signals from at least one log record on said record member, means providing relative linear movement between said record member and said pickup means, a chart, means for producing on said chart a visual log of signals picked up by said pickup means, means for reproducing on said chart said records of starts and stops of movement of the logging means, means providing on said chart markings corresponding to linear intervals along said record member, and means for providing on said record member, subsequent to the production of said log record thereon and in addition to said log record, depth correlating markings, said last mentioned means including presettable means for counting pulses derived from said pickup means.

14. In combination with a record member made in a bore hole and advanced during recording in the bore hole relatively to a recording means at a rate uncorrelated with depth, which record also contains starts and stops of movement of the logging means, apparatus for the production of a bore hole log substantially linear with depth from said record member comprising pickup means for picking up logged signals from at least one log record on said record member, means providing relative linear movement between said record member and said pickup means, a chart, means for producing on said chart a visual log of signals picked up by said pickup means, means for reproducing on said chart said records of starts and stops of movement of the logging means, means providing on said chart markings corresponding to linear intervals along said record member, and means for providing on said record member, subsequent to the production of said log record thereon and in addition to said log record, depth correlating markings, said last mentioned means including a pair of successively operating presettable means for counting pulses derived from said pickup means.

15. In combination with a record member containing a pulse log record made in a bore hole and advanced during recording in the bore hole relatively to a recording means at a rate uncorrelated with depth, apparatus for the production of a bore hole log substantially linear with depth from said record member comprising pickup means for picking up logged signals from at least one log record on said record member, means providing relative linear movement between said record member and said pickup means, a chart, and means for producing on said chart a visual variable amplitude log of the pulse signals picked up by said pickup means, the last mentioned means for producing a visual log comprising a sawtooth generator, means controlled by pulses of said log record to initiate sweeps of said sawtooth generator, and means for sampling the output of said generator at the times of occurrence of predetermined pulse events of said log record thereby to provide said visual variable amplitude log.

16. In combination with a record member containing a plurality of pulse log records made in a bore hole and advanced during recording in the bore hole relatively to a recording means at a rate uncorrelated with depth, apparatus for the production of a bore hole log substantially linear with depth from said record member comprising pickup means for picking up logged signals from said log records on said record member, means providing relative linear movement between said record member and said pickup means, a chart, and means for producing on said chart visual variable amplitude logs of the pulse signals picked up by said pickup means, the last mentioned means for producing visual logs comprising a sawtooth generator, and means for sampling the output of said generator at the times of occurrence of predetermined pulse events of said log record thereby to provide said visual variable amplitude log.

17. In combination with a record member containing a plurality of pulse log records made in a bore hole and advanced during recording in the bore hole relatively to a recording means at a rate uncorrelated with depth, apparatus for the production of a bore hole log substantially linear with depth from said record member comprising pickup means for picking up logged signals from said log records on said record member, means providing relative linear movement between said record member and said pickup means, a chart, and means for producing on said chart visual variable amplitude logs of the pulse signals picked up by said pickup means, the last mentioned means for producing visual logs comprising a sawtooth generator, means controlled by pulses of one of said log records to initiate sweeps of said sawtooth generator, and means for sampling the output of said generator at the times of occurrence of predetermined pulse events of said log record thereby to provide said visual variable amplitude log.

References Cited by the Examiner

UNITED STATES PATENTS

| | | | |
|---|---|---|---|
| 2,712,609 | 7/1955 | Herzog | 324—115 |
| 2,831,069 | 4/1958 | Snow | 179—100.2 |
| 2,841,778 | 7/1958 | Ball et al. | 340—18 |
| 2,879,126 | 3/1959 | James | 340—18 X |
| 2,920,306 | 1/1960 | Feagin | 340—15 |
| 2,950,352 | 8/1960 | Belck | 340—15 |
| 2,968,798 | 1/1961 | Drukey | 340—174.1 |
| 2,976,107 | 3/1961 | Klein | 340—15.5 X |
| 3,158,832 | 11/1964 | Skelton | 340—15.5 |

FOREIGN PATENTS

F 17479    5/1955    Germany.

BENJAMIN A. BORCHELT, *Primary Examiner.*

SAMUEL FEINBERG, IRVING L. SRAGOW,
*Examiners.*